US012621849B2

(12) United States Patent
Park et al.

(10) Patent No.: US 12,621,849 B2
(45) Date of Patent: May 5, 2026

(54) METHOD AND DEVICE FOR PERFORMING SL DRX OPERATION IN NR V2X ON BASIS OF HARQ FEEDBACK

(71) Applicant: LG Electronics Inc., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 18/269,397

(22) PCT Filed: Dec. 22, 2021

(86) PCT No.: PCT/KR2021/019666
§ 371 (c)(1),
(2) Date: Jun. 23, 2023

(87) PCT Pub. No.: WO2022/139492
PCT Pub. Date: Jun. 30, 2022

(65) Prior Publication Data
US 2024/0057125 A1 Feb. 15, 2024

Related U.S. Application Data

(60) Provisional application No. 63/140,271, filed on Jan. 22, 2021, provisional application No. 63/130,426, filed on Dec. 24, 2020.

(51) Int. Cl.
*H04W 72/25* (2023.01)
*H04L 1/1812* (2023.01)
(Continued)

(52) U.S. Cl.
CPC ........... *H04W 72/25* (2023.01); *H04L 1/1812* (2013.01); *H04L 1/1854* (2013.01); *H04W 72/12* (2013.01); *H04W 76/28* (2018.02); *H04L 1/1861* (2013.01)

(58) Field of Classification Search
CPC ..... H04W 72/25; H04W 72/12; H04W 76/28; H04W 76/14; H04W 4/40; H04L 1/1812; (Continued)

(56) References Cited

U.S. PATENT DOCUMENTS 11,356,979 B2 * 6/2022 He ......................... H04L 1/1861
12,245,235 B2 * 3/2025 Tseng .................... H04W 24/08
(Continued)

FOREIGN PATENT DOCUMENTS

| | | |
|---|---|---|
| KR | 10-2020-0093517 | 8/2020 |
| WO | WO 2020/218892 | 10/2020 |
| WO | WO-2021184384 A1 * | 9/2021 ............ H04W 52/02 |

OTHER PUBLICATIONS

Fouad et al., "Power-Efficient Resource Selection Procedures for NR V2X UEs with Limited Power", U.S. Appl. No. 63/089,762, filed Oct. 9, 2020, Total pp. 17 (Year: 2020).*
(Continued)

*Primary Examiner* — Shah M Rahman
(74) *Attorney, Agent, or Firm* — Fish & Richardson P.C.

(57) ABSTRACT

Proposed is a method for a first device to perform wireless communication according to an embodiment. The method may comprise the steps of: acquiring an SL DRX configuration including information related to a sidelink discontinuous reception (SL DRX) cycle and information related to an active time; transmitting first sidelink control information (SCI) to a second device through a first physical sidelink control channel (PSCCH), wherein the first sidelink control information (SCI) is for scheduling a first physical sidelink
(Continued)

obtaining an SL DRX configuration including information related to an SL DRX cycle and information related to an active time — S1210 transmitting, to a second device, first SCI for scheduling a first PSSCH through a first PSCCH — S1220 transmitting, to a second device, second SCI and a first MAC PDU through a first PSSCH — S1230 determining a first PSFCH resource within a first PSFCH slot, based on an index of a slot and an index of a subchannel, related to a first PSSCH — S1240 receiving, from a second device, a first HARQ feedback for a first MAC PDU based on a first PSFCH resource — S1250 control channel (PSSCH); transmitting second SCI and a first medium access control (MAC) protocol data unit (PDU) to the second device through the first PSSCH; determining a first physical sidelink feedback channel (PSFCH) resource in the first PSFCH slot on the basis of an index of a slot related to the first PSSCH and an index of a subchannel; and receiving a first hybrid automatic repeat request (HARQ) feedback for the first MAC PDU, the first HARQ feedback being received from the second device on the basis of the first PSFCH resource. For example, the first PSFCH slot may be included in an inactive time at the time of transmission of the first MAC PDU. For example, the first PSFCH slot may be included in an active time at the time of reception of the first HARQ feedback.

9 Claims, 16 Drawing Sheets

(51) Int. Cl.
  *H04L 1/1829*      (2023.01)
  *H04W 72/12*       (2023.01)
  *H04W 76/28*       (2018.01)

(58) Field of Classification Search
  CPC ........... H04L 2001/0092; H04L 1/1854; H04L 1/1861; H04L 5/0055
  See application file for complete search history.

(56)                    References Cited

U.S. PATENT DOCUMENTS

| | | | | |
|---|---|---|---|---|
| 2020/0288435 A1* | 9/2020 | Kwak | .................... | H04L 5/0094 |
| 2020/0344722 A1* | 10/2020 | He | ......................... | H04W 72/02 |
| 2020/0359375 A1 | 11/2020 | Hwang et al. | | |
| 2021/0227621 A1* | 7/2021 | Pan | .................... | H04W 72/0446 |
| 2022/0116942 A1* | 4/2022 | Fouad | .................. | H04B 17/318 |
| 2023/0063472 A1* | 3/2023 | Freda | ................ | H04W 52/0274 |
| 2023/0292343 A1* | 9/2023 | Zhang | .................... | H04L 1/1848 |
| 2023/0371113 A1* | 11/2023 | Zhou | ................. | H04W 52/0216 |
| 2024/0015656 A1* | 1/2024 | Do | ......................... | H04W 76/28 |

OTHER PUBLICATIONS

3GPP TS 38.321 V16.2.1 (Sep. 2020) 3rd Generation Partnership Project; Technical Specification Group Radio Access Network; NR; Medium Access Control (MAC) protocol specification (Release 16).
Extended European Search Report in European Appln. No. 21911558.1, mailed on Oct. 23, 2024, 11 pages.
Huawei, HiSilicon, "Consideration on the sidelink DRX for unicast, groupcast and broadcast," 3GPP TSG-RAN WG2 Meeting #112 electronic, R2-2009413, Nov. 2-13, 2020, 10 pages.
International Search Report and Written Opinion in International Appln. No. PCT/KR2022/019666, mailed on Mar. 17, 2022, 6 pages (with English translation).
OPPO, "The effect of DRX on resource selection," 3GPP TSG RAN WG1 #103-e, R1-2008241, e-Meeting, Oct. 26-Nov. 13, 2020, 5 pages.

* cited by examiner

FIG. 2

FIG. 10
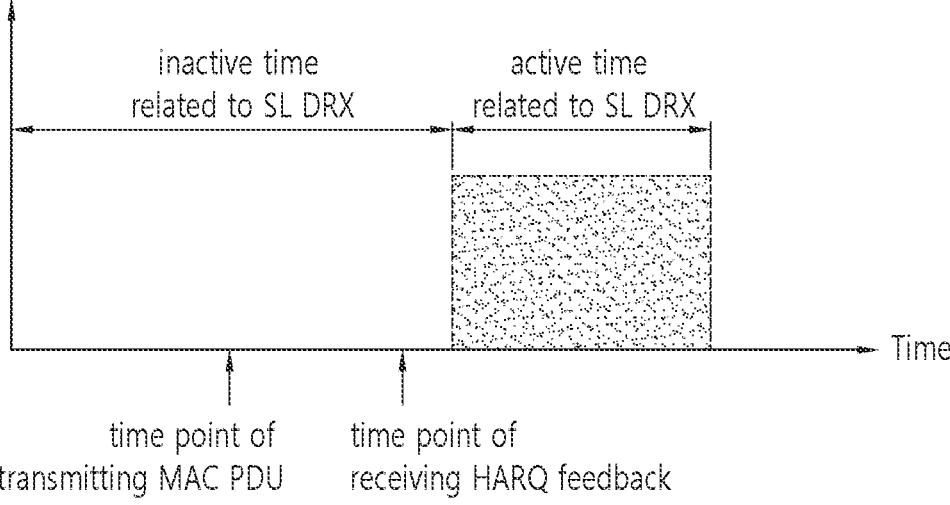
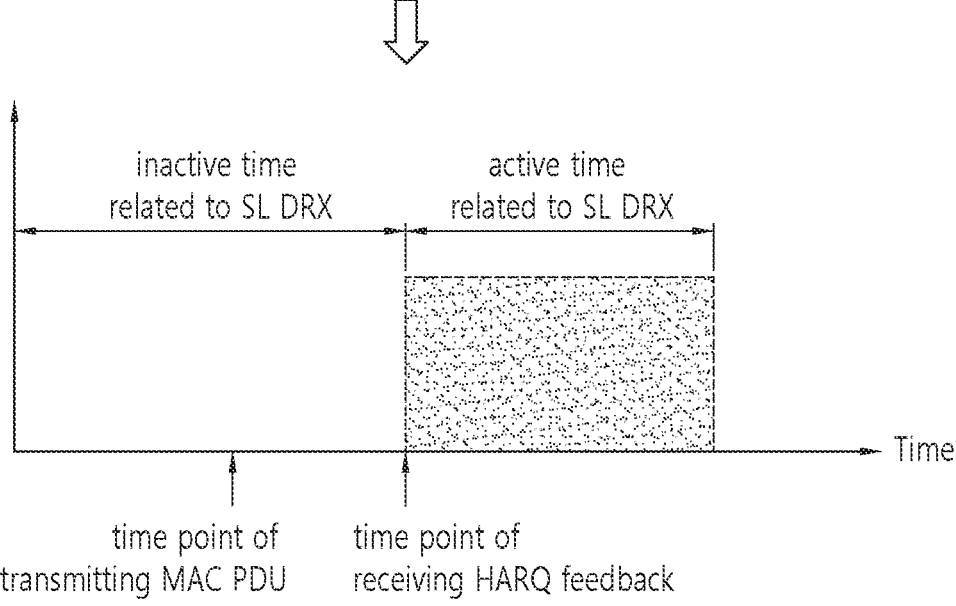

FIG. 12

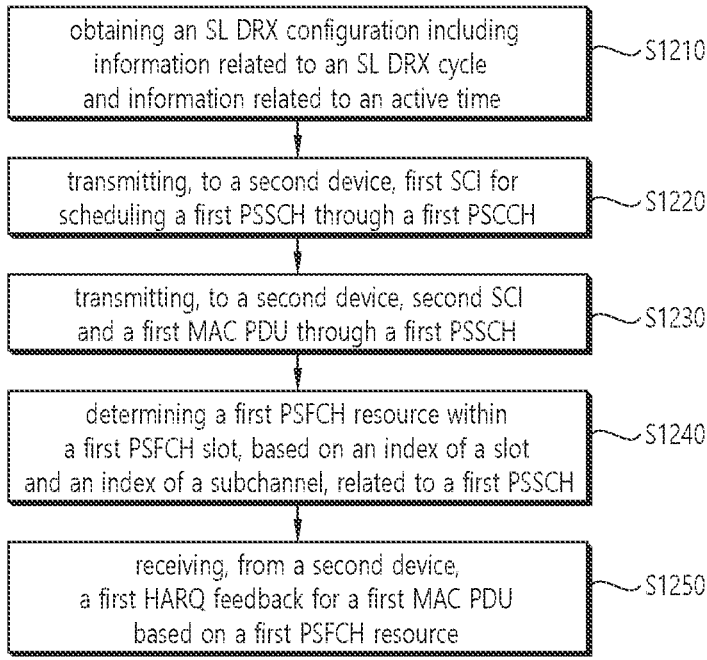

obtaining an SL DRX configuration including
information related to an SL DRX cycle
and information related to an active time — S1210 transmitting, to a second device, first SCI for
scheduling a first PSSCH through a first PSCCH — S1220 transmitting, to a second device, second SCI
and a first MAC PDU through a first PSSCH — S1230 determining a first PSFCH resource within
a first PSFCH slot, based on an index of a slot
and an index of a subchannel, related to a first PSSCH — S1240 receiving, from a second device,
a first HARQ feedback for a first MAC PDU
based on a first PSFCH resource — S1250

FIG. 13

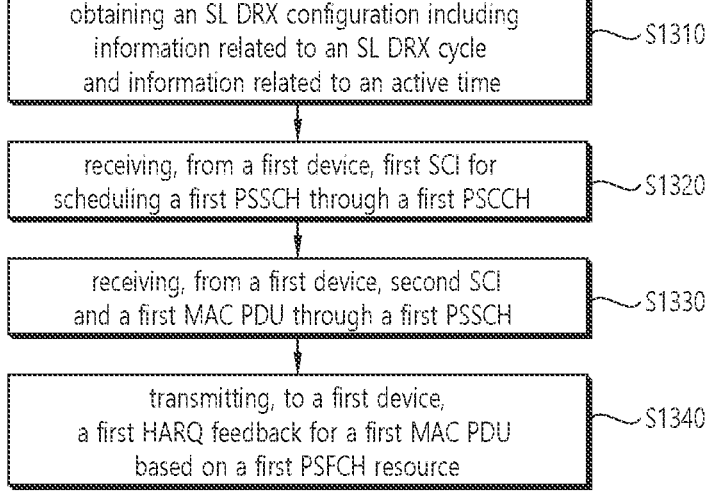

obtaining an SL DRX configuration including
information related to an SL DRX cycle
and information related to an active time — S1310 receiving, from a first device, first SCI for
scheduling a first PSSCH through a first PSCCH — S1320 receiving, from a first device, second SCI
and a first MAC PDU through a first PSSCH — S1330 transmitting, to a first device,
a first HARQ feedback for a first MAC PDU
based on a first PSFCH resource — S1340

Device (100,200)

FIG. 19

METHOD AND DEVICE FOR PERFORMING SL DRX OPERATION IN NR V2X ON BASIS OF HARQ FEEDBACK

CROSS-REFERENCE TO RELATED APPLICATIONS

This application is a National Stage application under 35 U.S.C. § 371 of International Application No. PCT/KR2021/019666, filed on Dec. 22, 2021, which claims the benefit of U.S. Provisional Application No. 63/130,426, filed on Dec. 24, 2020, and U.S. Provisional Application No. 63/140,271, filed on Jan. 22, 2021. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

On the other hand, in sidelink communication, in order to reduce the power of a UE, the UE may perform a sidelink discontinuous reception (SL DRX) operation. For example, when a transmitting UE (hereinafter referred to as a TX UE) transmits a physical sidelink control channel/physical sidelink shared channel (PSCCH/PSSCH) to a receiving UE (hereinafter referred to as an RX UE), and the TX UE receives a physical sidelink feedback channel (PSFCH) from the RX UE, it may occur that the time of the TX UE of receiving a PSFCH from the RX is during an inactive time period.

Also, for example, if a TX UE is unable to receive PSFCHs from an RX UE within an inactive time period, a problem may occur that what characteristics/types of data or medium access control (MAC) protocol data units (PDUs) the TX UE will transmit in the active time slot.

According to an embodiment of the present disclosure, a method for performing, by a first device, wireless communication may be proposed. The method may comprise: obtaining a sidelink discontinuous reception (SL DRX) configuration including information related to an SL DRX cycle and information related to an active time; transmitting, to a second device, first sidelink control information (SCI) for scheduling a first physical sidelink shared channel (PSSCH) through a first physical sidelink control channel (PSCCH); transmitting, to the second device, second SCI and a first medium access control (MAC) protocol data unit (PDU) through the first PSSCH; determining a first physical sidelink feedback channel (PSFCH) resource within a first PSFCH slot, based on an index of a slot and an index of a subchannel, related to the first PSSCH; and receiving, from the second device, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a first device for performing wireless communication may be proposed. For example, a first device may comprise: one or more memories storing instructions; one or more transceivers; and one or more processors connected to the one or more memories and the one or more transceivers. For example, the one or more processors may execute the instructions to: obtain a sidelink discontinuous reception (SL DRX) configuration including information related to an SL DRX cycle and information related to an active time; transmit, to a second device, first sidelink control information (SCI) for scheduling a first physical sidelink shared channel (PSSCH) through a first physical sidelink control channel (PSCCH); transmit, to the second device, second SCI and a first medium access control (MAC) protocol data unit (PDU) through the first PSSCH; determine a first physical sidelink feedback channel (PSFCH) resource within a first PSFCH slot, based on an index of a slot and an index of a subchannel, related to the first PSSCH; and receive, from the second device, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink discontinuous reception (SL DRX) configuration including information related to an SL DRX cycle and information related to an active time; transmit, to a second UE, first sidelink control information (SCI) for scheduling a first physical sidelink shared channel (PSSCH) through a first physical sidelink control channel (PSCCH); transmit, to the second UE, second SCI and a first medium access control (MAC) protocol data unit (PDU) through the first PSSCH; determine a first physical sidelink feedback channel (PSFCH) resource within a first PSFCH slot, based on an index of a slot and an index of a subchannel, related to the first PSSCH; and receive, from the second UE, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a non-transitory computer-readable storage medium storing instructions may be proposed. For example, the instructions, when executed, may cause a first device to: obtain a sidelink discontinuous reception (SL DRX) configuration including information related to an SL DRX cycle and information related to an active time; transmit, to a second device, first sidelink control information (SCI) for scheduling a first physical sidelink shared channel (PSSCH) through a first physical sidelink control channel (PSCCH); transmit, to the second device, second SCI and a first medium access control (MAC) protocol data unit (PDU) through the first PSSCH; determine a first physical sidelink feedback channel (PSFCH) resource within a first PSFCH slot, based on an index of a slot and an index of a subchannel, related to the first PSSCH; and receive, from the second device, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a method for performing, by a second device, wireless communication may be proposed. The method may comprise: obtaining a sidelink discontinuous reception (SL DRX) configuration including information related to an SL DRX cycle and information related to an active time; receiving, from a first device, first sidelink control information (SCI) for scheduling a first physical sidelink shared channel (PSSCH) through a first physical sidelink control channel (PSCCH); receiving, from the first device, second SCI and a first medium access control (MAC) protocol data unit (PDU) through the first PSSCH; and transmitting, to the first device, a first hybrid automatic repeat request (HARQ) feedback for the first MAC PDU based on a first physical sidelink feedback channel (PSFCH) resource. For example, the first PSFCH resource may be determined within a first PSFCH slot, based on an index of a slot and an index of a subchannel, related to the first PSSCH. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a second device for performing wireless communication may be proposed. For example, a second device may comprise: one or more memories storing instructions; one or more transceivers; and one or more processors connected to the one or more memories and the one or more transceivers. For example, the one or more processors may execute the instructions to: obtain a sidelink discontinuous reception (SL DRX) configuration including information related to an SL DRX cycle and information related to an active time; receive, from a first device, first sidelink control information (SCI) for scheduling a first physical sidelink shared channel (PSSCH) through a first physical sidelink control channel (PSCCH); receive, from the first device, second SCI and a first medium access control (MAC) protocol data unit (PDU) through the first PSSCH; and transmit, to the first device, a first hybrid automatic repeat request (HARQ) feedback for the first MAC PDU based on a first physical sidelink feedback channel (PSFCH) resource. For example, the first PSFCH resource may be determined within a first PSFCH slot, based on an index of a slot and an index of a subchannel, related to the first PSSCH. For example, the first PSFCH slot may be included within an inactive time at a time point of transmitting the first MAC PDU. For example, the first PSFCH slot may be included within an active time at a time point of receiving the first HARQ feedback.

A transmitting UE may maintain sidelink (SL) communication smoothly by receiving hybrid automatic repeat request (HARQ) feedback for a MAC protocol data unit (PDU) or data transmitted by a transmitting UE within an active time.

BRIEF DESCRIPTION OF THE DRAWINGS

FIG. 2 shows a radio protocol architecture, based on an embodiment of the present disclosure.

FIG. 10 is another example of SL DRX operation based on HARQ feedback, according to one embodiment of the present disclosure.

FIG. 12 shows a method for a first device to receive first HARQ feedback for a first MAC PDU based on a first PSFCH resource, according to one embodiment of the present disclosure.

FIG. 13 shows a method for a second device to transmit first HARQ feedback to a first MAC PDU based on a first PSFCH resource, according to one embodiment of the present disclosure.

FIG. 19 shows a vehicle or an autonomous vehicle, based on an embodiment of the present disclosure.

DETAILED DESCRIPTION

Figure 1:
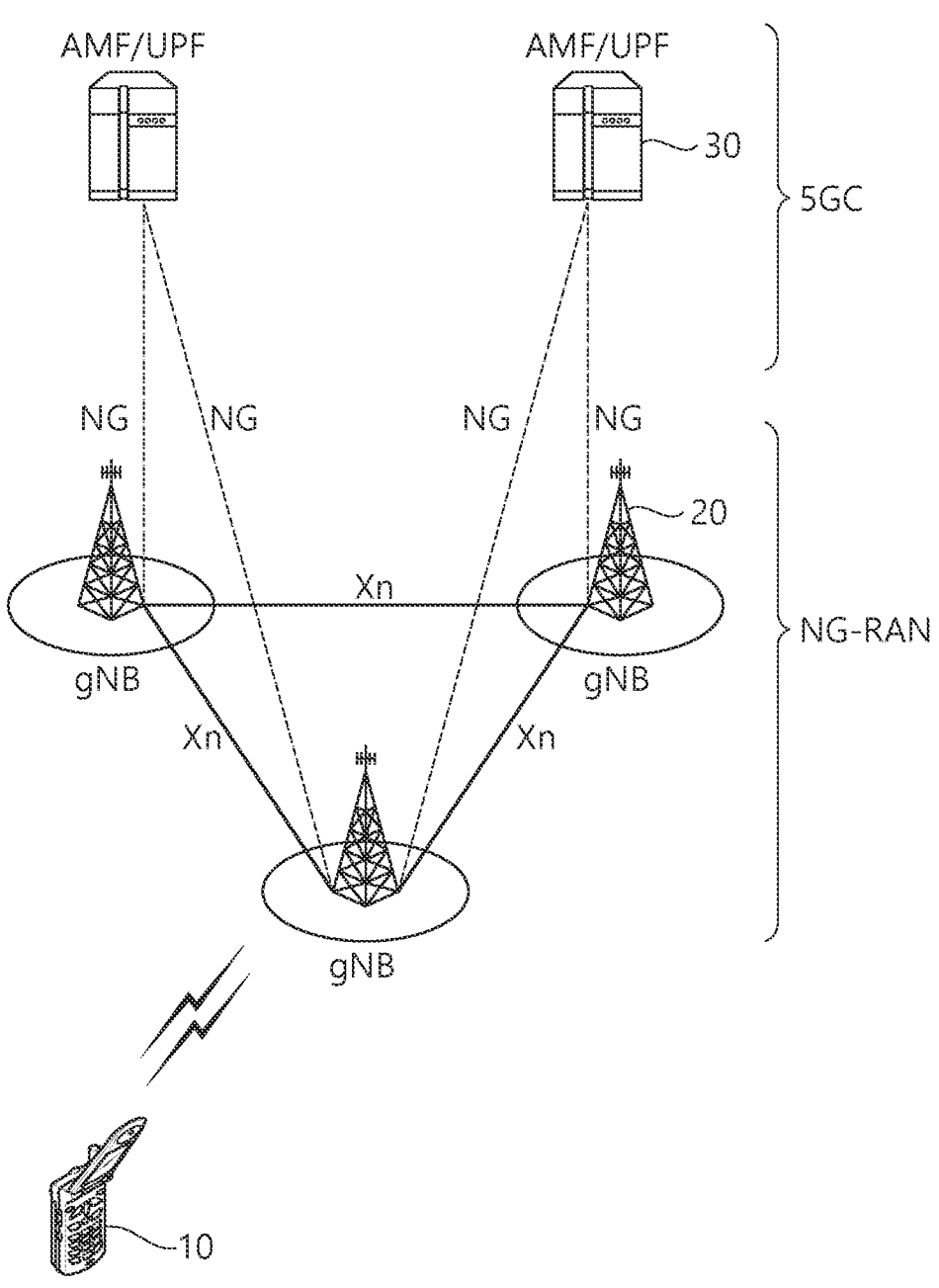
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
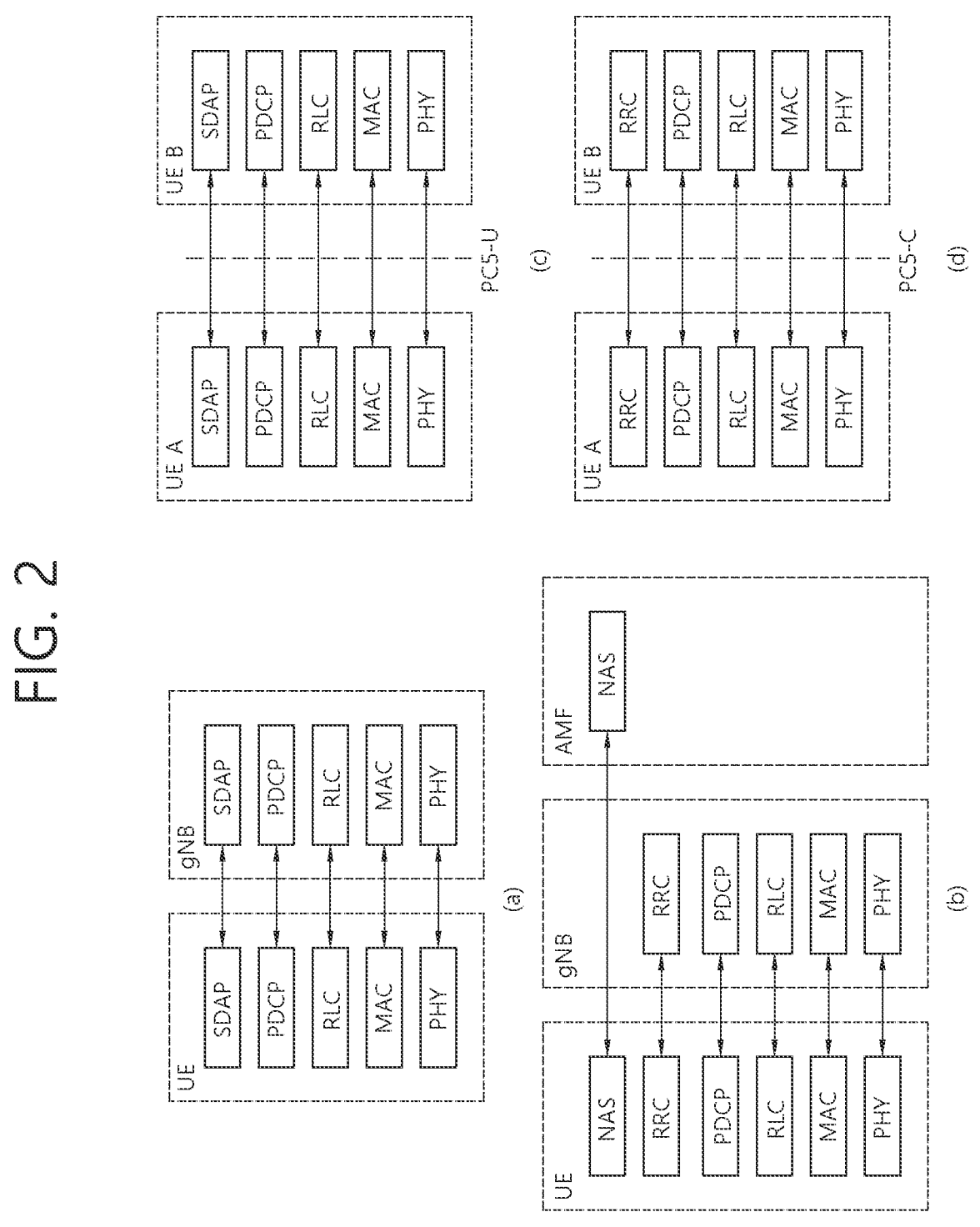

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC CONNECTED state, and, otherwise, the UE may be in an RRC IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
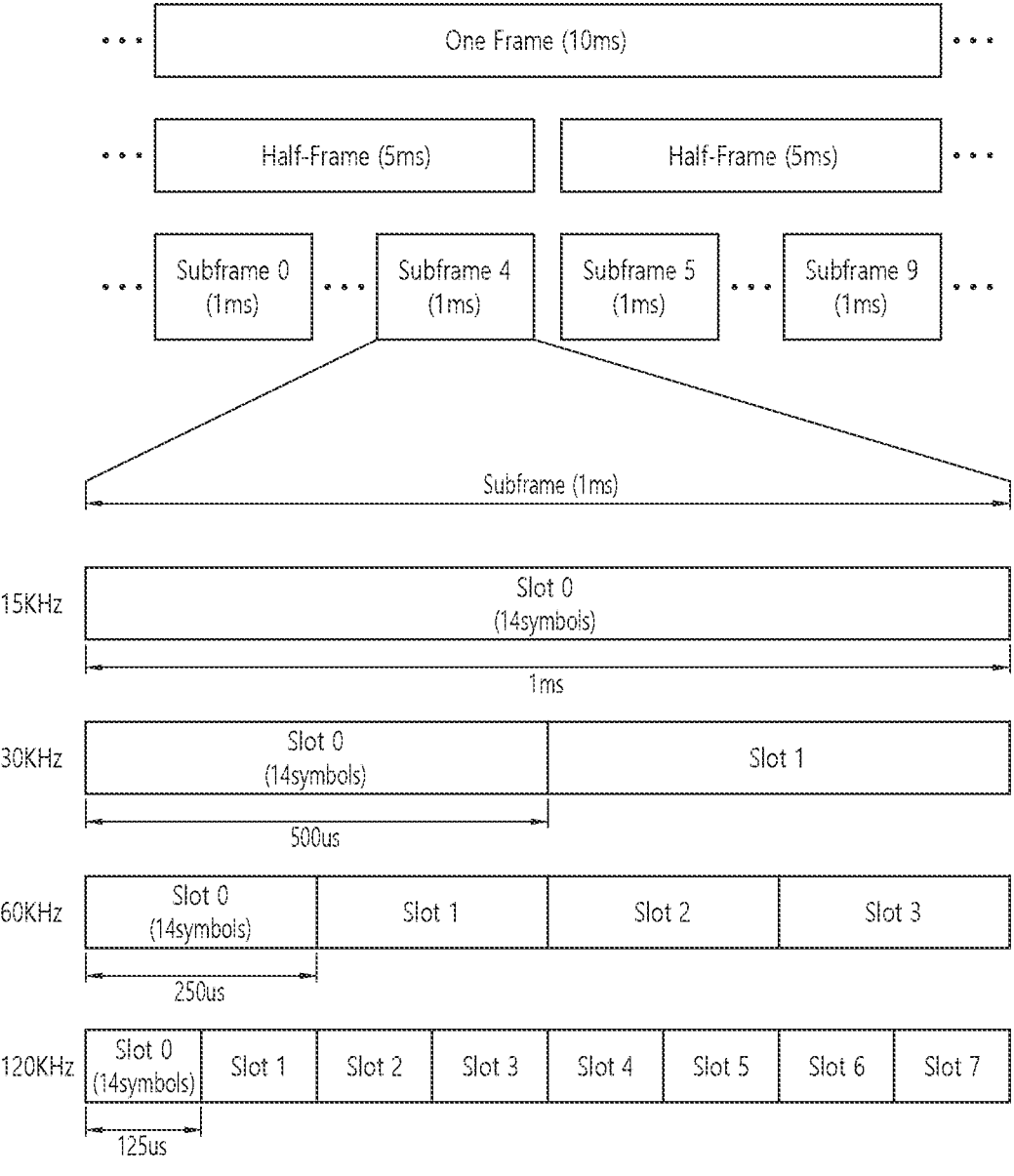
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot s ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

Figure 4:
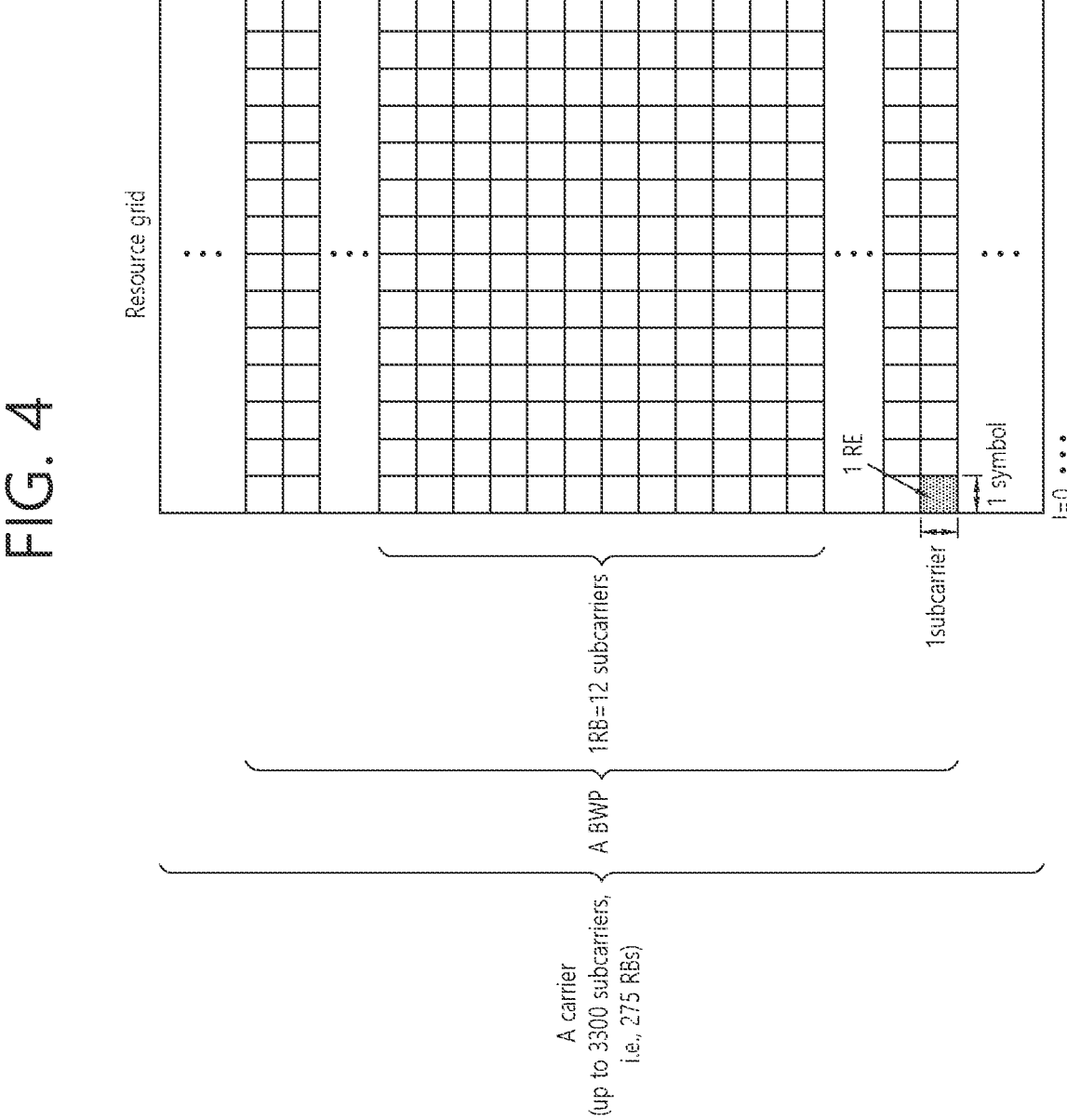
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
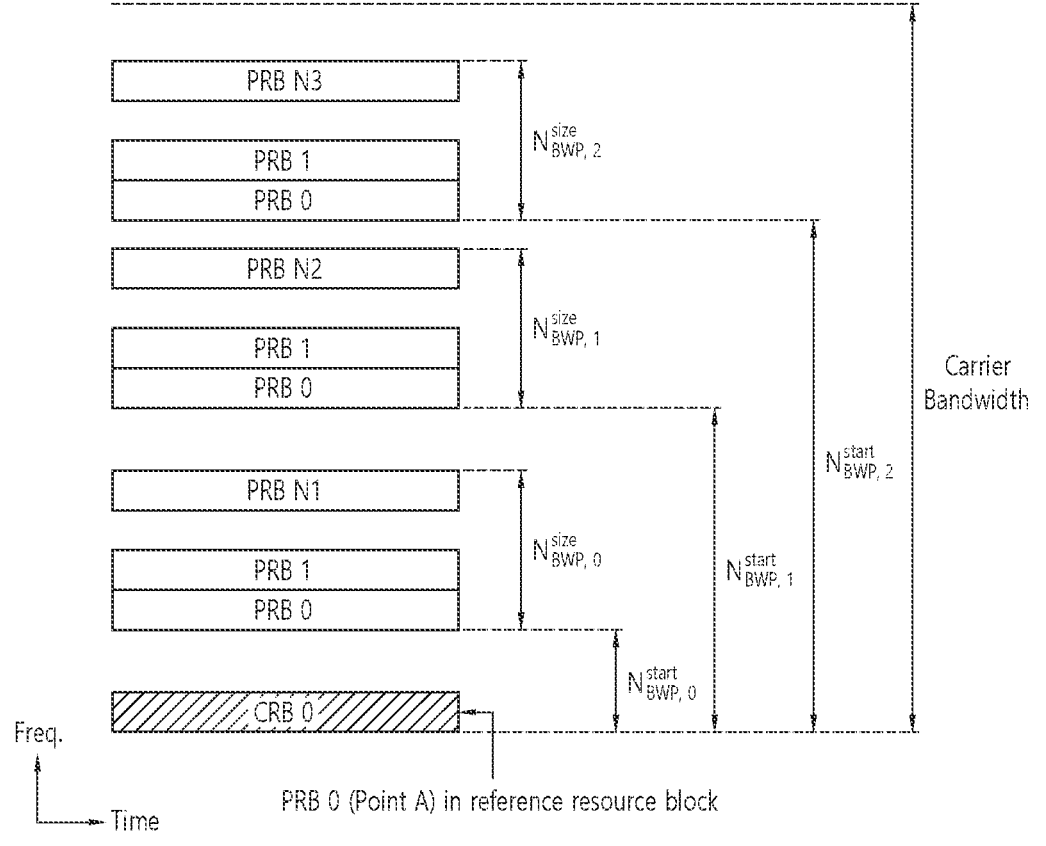
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
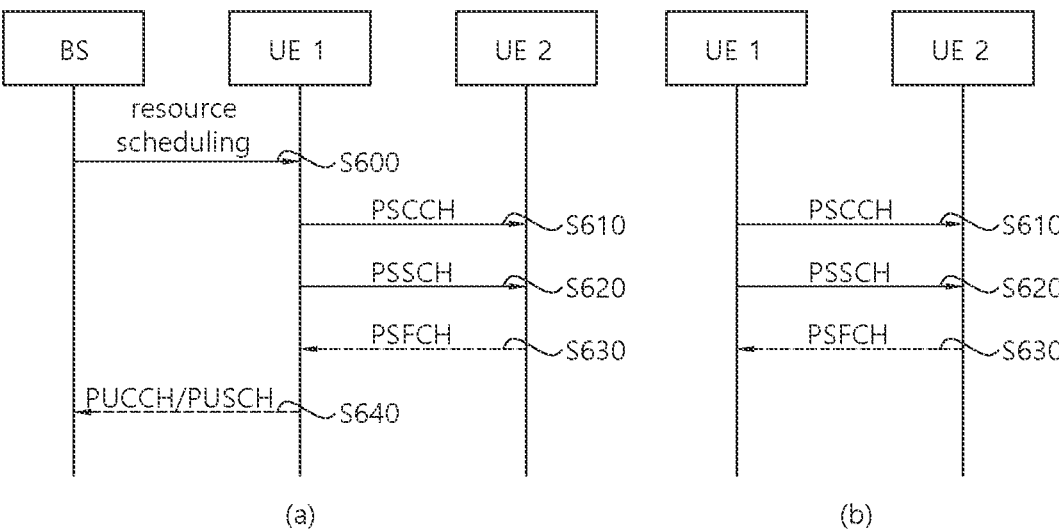
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits.

New data indicator—1 bit.

Lowest index of the subchannel allocation to the initial transmission—ceiling ($\log_2(N^{SL}_{subChannel})$) bits SCI format 1-A field: Frequency resource assignment, Time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH, PUCCH resource indicator—3 bits Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2$ ($N^{SL}_{subChannel}(N^{SL}_{subChannel}+1)/2$)) bits when the value of the higher layer parameter sl-MaxNumPerReserve is configured to 2; otherwise ceiling $\log_2(N^{SL}_{subChannel}$ $(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described. SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B is described. SCI format 2-B is used to decode PSSCH and is used in conjunction with HARQ operation when HARQ-ACK information includes only NACK or when there is no feedback of HARQ-ACK information.

In HARQ operation, if HARQ-ACK information includes only NACK, or if there is no feedback of HARQ-ACK information, SCI format 2-B is used to decode a PSSCH.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource. Referring to (a) of FIG. 6, in step S640, the first UE may transmit SL HARQ feedback to the base station through the PUCCH and/or the PUSCH.

Hereinafter, a UE procedure for reporting HARQ-ACK in the sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \leq k < T'_{max}$) has a PSFCH transmission occasion resource if k mod $N^{PSFCH}_{PSSCH} = 0$, where $t'^{SL}_k$ is a slot that belongs to the resource pool, T'max is a number of slots that belong to the resource pool within 10240 msec, and N PSFCH PSSCH is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots related to a PSFCH slot that is less than or equal to N PSFCH PSSCH, the UE allocates the $[(i+j \cdot N^{PSFCH}_{PSSCH}) \cdot M^{PSFCH}_{subch,slot},$ $(i+1+j \cdot N_{PSFCH}^{PSSCH}) \cdot M^{PSFCH}_{subch,slot}-1]$ PRBs from the $M^{PSFCH}_{PRB,set}$ PRBs to slot i among the PSSCH slots related to the PSFCH slot and sub-channel j, where $M^{PSFCH}_{subch,slot} = M^{PSFCH}_{PRB,set}/(N_{subch} \cdot N^{PSFCH}_{PSSCH})$, $0 \leq i < N_{PSFCH}^{PSSCH}$, $0 \leq j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type} = 1$ and the $M^{PSFCH}_{subch,slot}$ PRBs are related to the starting sub-channel of the corresponding PSSCH $N^{PSFCH}_{type} = N^{PSSCH}_{subch}$ and the $N^{PSSCH}_{subch} \cdot M^{PSFCH}_{subch,slot}$ PRBs are related to one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID} + M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift $\alpha$, from a cyclic shift pair index corresponding to a PSFCH resource index and from N PSFCH CS using Table 8.

TABLE 8

| | $m_0$ | | | | | |
| --- | --- | --- | --- | --- | --- | --- |
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift $\alpha$, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
| --- | --- | --- |
| Sequence cyclic shift | 0 | 6 |

TABLE 10

| HARQ-ACK Value | 0 (NACK) | 1 (ACK) |
| --- | --- | --- |
| Sequence cyclic shift | 0 | N/A |

Figure 7:
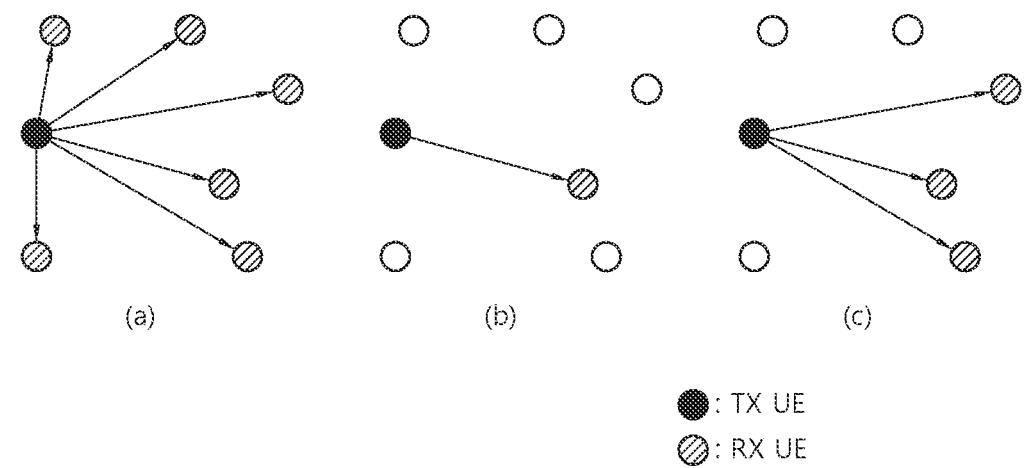
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(a) shows broadcast-type SL communication, FIG. 7(b) shows unicast type-SL communication, and FIG. 7(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

For example, SL DRX configurations may include one or more of the information listed below.

For example, SL drx-onDurationTimer may be information regarding the duration at the beginning of a DRX Cycle. For example, the duration at the beginning of a DRX Cycle may be information regarding the duration during which a UE is operating om active mode to transmit or receive sidelink data.

For example, SL drx-SlotOffset may be information regarding the delay before starting the drx-onDuration-Timer.

For example, SL drx-InactivityTimer may be information regarding the duration after the PSCCH occasion in which a PSCCH indicates a new sidelink transmission and sidelink reception for the MAC entity. For example, if a transmitting UE indicates transmission of a PSSCH through a PSCCH, a transmitting UE may transmit a PSSCH to a receiving UE by operating in active mode while SL drx-InactivityTimer is operating. Further, for example, if a receiving UE is indicated that a transmitting UE transmits a PSSCH by a transmitting UE through a reception of a PSCCH, a receiving UE may receive a PSSCH from a transmitting UE by operating in active mode while SL drx-InactivityTimer is operating.

For example, SL drx-RetransmissionTimer may be information regarding the maximum duration until a retransmission is received. For example, SL drx-RetransmissionTimer may be configured per HARQ process.

For example, SL drx-LongCycleStartOffset may be information regarding the Long DRX cycle and drx-StartOffset which defines the subframe where the Long and Short DRX Cycle starts.

For example, SL drx-ShortCycle may be information regarding the Short DRX cycle. For example, SL drx-ShortCycle may be optional information.

For example, SL drx-ShortCycleTimer may be information regarding the duration the UE shall follow the Short DRX cycle. For example, SL drx-ShortCycleTimer may be optional information.

For example, SL drx-HARQ-RTT-Timer may be information regarding the minimum duration before an assignment for HARQ retransmission is expected by the MAC entity. For example, SL drx-HARQ-RTT-Timer may be configured per HARQ process.

On the other hand, NR V2X in release 16 did not support power saving operation of user equipment (UEs), and NR V2X in release 17 may support power saving operation of UEs (e.g., power saving UEs).

For example, a UE may perform sidelink DRX operation based on a sidelink (SL) discontinuous reception (DRX) pattern (e.g., DRX Cycle, DRX On-duration, DRX Off-duration) to perform power saving operation. For example, for SL DRX operation, an SL DRX Configuration (e.g., SL DRX Cycle, SL DRX On-duration, SL DRX Off-duration, timer to support SL DRX operation, etc.) to be used by a Power Saving UE (P-UE) needs to be defined. In addition, an operation of a transmitting and a receiving UE needs to be defined in an on-duration (the period during which sidelink reception/transmission can be performed)/off-duration (the period during which UEs operate in sleep mode).

In various embodiments of the present disclosure, for SL DRX operation, PSFCH transmission/reception operation of a transmitting and a receiving UE within on-duration/off-duration is proposed. In the following description, "when, if, in case of" may be replaced with "based on".

In the following description, names of the timers (Uu DRX HARQ RTT TimerSL, Uu DRX Retransmission TimerSL, etc.) are exemplary, and a timer that performs the same/similar functions based on what is described in each timer may be considered the same/similar timer regardless of the name.

On the other hand, if PSFCH reception is not possible within an inactive time period, which characteristics or types of MAC PDUs, LCH data, or service data a UE will transmit within the active time period may be discussed.

According to one embodiment of the present disclosure, when PSFCH reception is not allowed within an inactive time period, a transmitting UE (hereinafter referred to as a TX UE) may be allowed to transmit a MAC PDU in which a HARQ feedback enabled to a target receiving UE (hereinafter referred to as an RX UE) when a specific condition is met. Here, for example, a TX UE may be a UE that is performing SL DRX operation from an RX operation perspective. For example, a specific condition may be that, from the perspective of a TX UE, the time of receiving a PSFCH related to a MAC PDU in which a transmitted HARQ feedback is enabled is included within its active time. For example, if an active time of a TX UE includes a time point of the TX UE receiving a PSFCH for a MAC PDU in which a HARQ feedback is enabled, a TX UE may transmit a MAC PDU in which a HARQ feedback is enabled to a target RX UE.

For example, if a PSFCH receiving operation is not set on a UE during the inactive time window, a TX UE may transmit a MAC PDU in which HARQ feedback is enabled to a target RX UE when specific condition is met. Here, for example, a TX UE may be a UE that is performing SL DRX operation in terms of RX operation.

Here, for example, if a specific condition is not met, only the transmission of a MAC PDU in which a HARQ feedback is disabled may be allowed to a TX UE. For example, if the active time of a TX UE does not include a time point where the TX UE receives a PSFCH for a MAC PDU in which a HARQ feedback is enabled is transmitted by the TX UE, only the transmission of a MAC PDU in which a HARQ feedback is disabled may be allowed to the TX UE.

Alternatively, for example, if PSFCH reception is not allowed within an inactive time period, a TX UE may only be allowed to transmit a MAC PDU in which a HARQ feedback is disabled. For example, if no PSFCH reception operation is configured for a UE within an inactive time period, a TX UE may always transmit only a MAC PDU in which a HARQ feedback is disabled.

According to one embodiment of the present disclosure, whether to allow PSFCH reception during an inactive time window may be configured differently or independently based on at least one of the following: cast type (e.g., unicast, groupcast, broadcast), service type, priority, QoS requirements (e.g., latency, reliability), whether to operate SL DRX based on a long DRX cycle or whether to operate SL DRX based on a short DRX cycle.

According to one embodiment of the present disclosure, if an interval (hereinafter, INTER_WIN) between the time point of transmitting a MAC PDU in which a HARQ feedback is enabled and the time point of receiving a linked PSFCH is less than a pre-configured threshold, a UE may wake up (e.g., perform PSCCH monitoring, PSSCH decoding, sensing operations, etc.) during the INTER WIN interval. For example, if the interval between the time point of transmitting a MAC PDU in which a HARQ feedback is enabled and the time point of receiving a PSFCH related to the MAC PDU is less than a pre-configured threshold, a UE may operate as an active time during the interval. That is, a UE may perform PSCCH monitoring, PSSCH decoding, or sensing operations during the interval. For example, the pre-configured threshold value may be configured/determined differently or independently for each priority related to a MAC PDU.

According to one embodiment of the present disclosure, a UE that transmits a sidelink packet and expects to receive a PSFCH (e.g., HARQ ACK or HARQ NACK) from a neighboring UE may remain in active mode and monitor a reception of a PSFCH, even during in a sidelink DRX inactivity period, until the time point of receiving a linked PSFCH and the time point of transmitting a MAC PDU in which a HARQ feedback is enabled. At that time, if a UE receives a PSFCH from a counterpart UE, the UE may transition to sidelink sleep mode for the remaining sidelink inactive time period.

According to one embodiment of the present disclosure, a UE that transmits a sidelink packet and expects to receive a PSFCH (e.g., HARQ ACK or HARQ NACK) from a counterpart UE, may transmit a sidelink packet and start a new SL DRX timer. For example, a UE may operate in active state until the SL DRX timer expires. During the active state, a UE may receive a PSFCH transmitted by a counterpart UE. For example, when a UE receives a PSFCH from a counterpart UE, a UE may transition to sidelink sleep mode within a remaining sidelink inactive time interval. For example, when the SL DRX timer expires, a UE may transition to sidelink sleep mode within the remaining sidelink inactive time period.

According to one embodiment of the present disclosure, a UE may operate in sidelink DRX sleep mode from after a time point of transmitting a PSCCH/PSSCH, until a time point of receiving a PSFCH, and the UE may wake up only at the time point of receiving a PSFCH.

Various embodiments of the present disclosure may be applied in a sidelink DRX inactive time period as well as a sidelink DRX on-duration time period and a sidelink DRX active time period.

For example, the threshold described above may be configured/determined differently or independently for each priority related to a MAC PDU.

For example, a UE operating in an active state may include a UE operating in an active time.

Here, for example, the various embodiments described above may be applied to at least one of an on-duration timer, an inactivity timer, a retransmission timer, a long DRX cycle, a DRX start offset, a short DRX cycle, a DRX slot offset, or a HARQ RTT timer.

In various embodiments of the present disclosure, an SL DRX timers mentioned below may be used for the following purposes.

For example, an SL DRX on-duration timer may be used in an interval where a UE performing SL DRX operation needs to operate by default in an active time to receive PSCCH/PSSCH from a counterpart UE.

For example, an SL DRX inactivity timer may be used in an interval that extends the SL DRX on-duration interval, which is an interval during which a UE performing an SL DRX operation must operate as active time by default to receive PSCCH/PSSCH from a counrterpart UE. That is, for example, an SL DRX on-duration timer may be extended by an SL DRX inactivity timer interval. In addition, when a UE receives a new packet (e.g., a new PSSCH) from a counterpart UE, it may start an SL DRX inactivity timer to extend an SL DRX on-duration timer. For example, the SL DRX HARQ RTT timer may be used in an interval where a UE performing SL DRX operation is operating in sleep mode until it receives a retransmission packet (or PSSCH assignment) which a counterpart UE transmits. That is, for example, when a UE starts an SL DRX HARQ RTT timer, it may operate in sleep mode during the timer duration, after determining that a counterpart UE will not transmit a sidelink retransmission packet to itself, until the SL DRX HARQ RTT timer expires.

For example, an SL DRX retransmission timer may be used in an interval where a UE performing SL DRX operation is operating as active time to receive a retransmission packet (or PSSCH assignments) transmitted by a counterpart UE. For example, during an SL DRX retransmission timer interval, a UE may monitor a reception of retransmission sidelink packet (or PSSCH assignments) transmitted by a counterpart UE.

Various embodiments of the present disclosure may be applied to a UE-Pair Specific SL DRX configuration, a UE-Pair Specific SL DRX pattern, a parameter included in a UE-Pair Specific SL DRX configuration, and a timer included in a UE-Pair Specific SL DRX configuration, not only to a Default/Common SL DRX configuration, a Default/Common SL DRX pattern, a parameter included in a Default/Common SL DRX configuration, or a timer included in Default/Common SL DRX configuration.

Also, in the present disclosure, for example, an "On-duration" may be an interval of Active Time period. For example, an active time may be an interval of operating in wake up state (an RF module is "on") to receive/transmit a radio signal. For example, an "Off-duration" may be a Sleep Time interval. For example, a Sleep Time interval may be an interval of operating in sleep mode state (RF module is "off") for power saving. For example, a sleep time interval may not imply that a transmitting UE is obligated to operate in sleep mode during the sleep time interval. For example, a UE may be allowed to operate in active time for a short period of time for sensing operations/transmission operations, if required, even during sleep time.

For example, whether to apply the various embodiments of the present disclosure may be configured independently or differently for at least one of elements/parameters such as service type, priority, QoS requirements (e.g., reliability, latency), whether HARQ feedback is enabled, whether HARQ feedback is disabled, LCH, MAC PDU, CBR measurement value of resource pool, SL cast type (e.g., unicast, groupcast, broadcast), SL groupcast HARQ feedback options (e.g., a method for feeding back only NACK, a method for feeding back ACK/NACK, a method for feeding back only TX-RX distance-based NACK), SL mode 1 CG type (e.g., SL CG type 1, SL CG type 2), SL mode type (e.g., mode 1, mode 2), resource pool, whether or not a PSFCH resource is a configured resource pool.

For example, a parameter configuration value related to various embodiments of the present disclosure may be configured independently or differently for at least one of elements/parameters such as service type, priority, QoS requirements (e.g., reliability, latency), whether HARQ feedback is enabled, whether HARQ feedback is disabled, LCH, MAC PDU, CBR measurement value of resource pool, SL cast type (e.g., unicast, groupcast, broadcast), SL groupcast HARQ feedback options (e.g., a method for feeding back only NACK, a method for feeding back ACK/NACK, a method for feeding back only TX-RX distance-based NACK), SL mode 1 CG type (e.g., SL CG type 1, SL CG type 2), SL mode type (e.g., mode 1, mode 2), resource pool, whether or not a PSFCH resource is a configured resource pool.

In addition, for example, as used herein, "configuration" or "designation" may include a form in which a base station informs a UE through a predefined physical layer channel/signal or higher layer channel/signal (e.g., SIB, RRC, MAC CE). For example, a "configuration" or "designation" may include a form of being provided through pre-configuration, or a form in which a UE informs another UE through a predefined physical layer channel/signal or higher layer channel/signal (e.g., SL MAC CE, PC5 RRC). Further, the various embodiments of the present disclosure may be combined with each other.

In the present disclosure, for example, a "certain time" may be a period of time during which a UE operates as an Active Time for a predefined time to receive sidelink signaling or sidelink data from a counterpart UE. For example, a "certain time" may be a period of time during which a UE operates as active time for a timer (SL DRX retransmission timer, SL DRX inactivity timer, timer that ensures that the RX UE is active in DRX operation) time to receive sidelink signaling or sidelink data from a counterpart UE.

Various embodiments of the present disclosure may be applied to millimeter wave (mmWave) SL operation. The various embodiments of the present disclosure may be applied to millimeter wave (mmWave) SL operation. The parameter configuration value related to the various embodiments of the present disclosure may be applied to millimeter wave (mmWave) SL operation.

Figure 8:
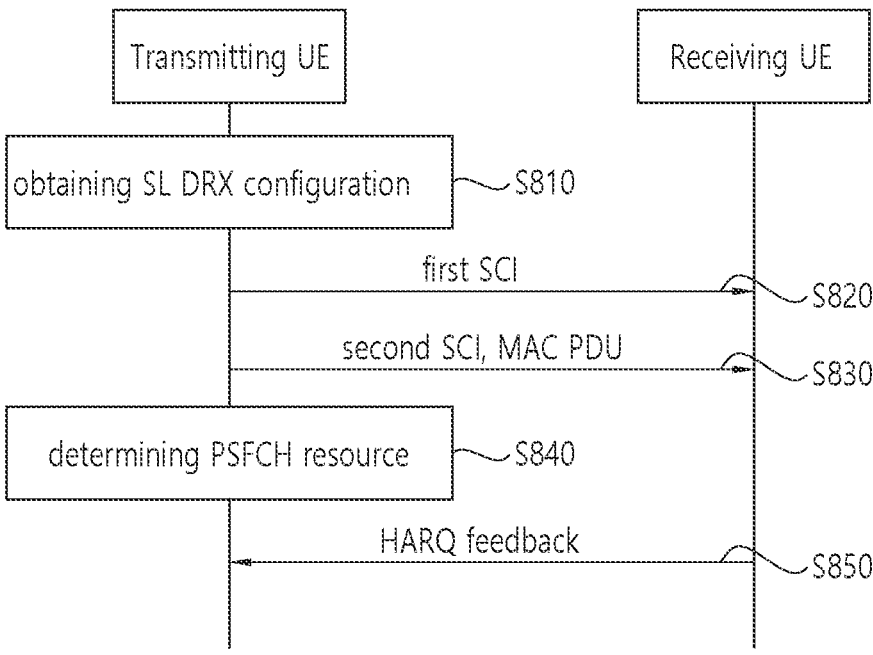
FIG. 8 shows a procedure for a transmitting UE to receive HARQ feedback at an active time, according to one embodiment of the present disclosure.

FIG. 8 shows a procedure for a transmitting UE to receive HARQ feedback at an active time, according to one embodiment of the present disclosure. The embodiment of FIG. 8 may be combined with various embodiments of the present disclosure.

Referring to FIG. 8, in step S810, a transmitting UE may obtain an SL DRX configuration that includes information related to a sidelink discontinuous reception (SL DRX) cycle and information related to an active time. For example, a transmitting UE may receive an SL DRX configuration from a base station. For example, a transmitting UE may determine an SL DRX configuration.

In step S820, a transmitting UE may transmit, to a receiving UE, a first sidelink control information (SCI) for scheduling a physical sidelink shared channel (PSSCH) through a physical sidelink control channel (PSCCH).

In step S830, a transmitting UE may transmit second SCI and a medium access control (MAC) protocol data unit (PDU) through a PSSCH to a receiving UE.

In step S840, a transmitting UE may determine a physical sidelink feedback channel (PSFCH) resource within a PSFCH slot, based on an index of a slot and an index of a subchannel, related to a PSSCH.

In step S850, a transmitting UE may receive, from a receiving UE, a hybrid automatic repeat request (HARQ) feedback for the MAC PDU based on the PSFCH resource. For example, a HARQ feedback may include any one of a HARQ ACK or a HARQ NACK.

For example, at the time point of transmitting a MAC PDU, the PSFCH slot may be included within an inactive time. For example, at the time point of receiving the HARQ feedback, the PSFCH slot may be included with in an active time.

For example, a transmitting UE may transition to an active time based on the PSFCH slot being included within an inactive time at the time point of transmitting a MAC PDU. For example, the active time may be maintained from the time point of transmitting a MAC PDU to the time point of receiving a HARQ feedback. Alternatively, for example, the inactive time may be maintained from the time point of transmitting the MAC PDU to a time point prior to receiving the HARQ feedback.

For example, at the time point of receiving the HARQ feedback, a transmitting UE may be transitioned to an active time.

For example, based on an interval between a time point of transmitting the MAC PDU and a time point of receiving the HARQ feedback being less than a pre-configured threshold, a transmitting UE may operate as an active time during the interval. For example, the pre-configured threshold may be determined based on a priority related to the MAC PDU.

For example, based on the transmitting UE being in an active time at the time point of receiving the HARQ feedback, the MAC PDU in which a HARQ feedback is enabled may be transmitted.

For example, based on transmitting the MAC PDU, a timer related to SL DRX may be started. For example, a transmitting UE may operate as an active time until a timer related to the SL DRX expires.

For example, based on at least one of cast type, service type, or QoS requirements, a transmitting UE may be allowed to receive a HARQ feedback during an inactive time.

Figure 9:
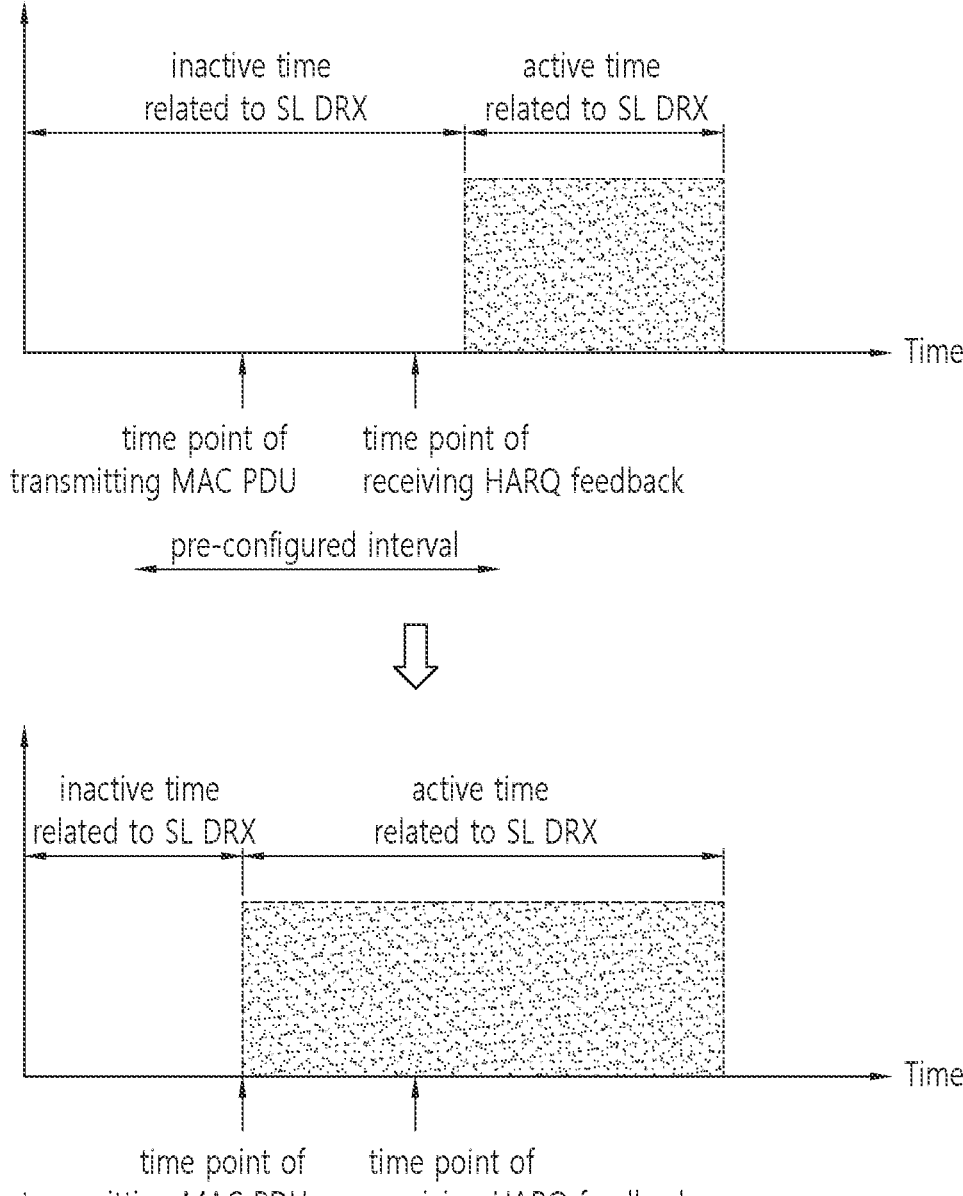
FIG. 9 is an example of an SL DRX operation based on HARQ feedback, according to one embodiment of the present disclosure.

FIG. 9 is an example of an SL DRX operation based on HARQ feedback, according to one embodiment of the present disclosure. The embodiment of FIG. 9 may be combined with various embodiments of the present disclosure.

Referring to FIG. 9, a transmitting UE may obtain an SL DRX configuration including information related to an SL DRX cycle and information related to an active time, and may perform an SL DRX operation based on the SL DRX configuration. For example, at a time point of a transmitting UE transmitting a MAC PDU to a receiving UE, a time point of the transmitting UE receiving HARQ feedback related to the MAC PDU may be included within an inactive time related to the SL DRX of the transmitting UE.

If the time point of receiving a HARQ feedback related to the MAC PDU is included within an inactive time related to SL DRX of a transmitting UE, for example, the transmitting UE may transition to the active time related to the SL DRX from the time point of transmitting a MAC PDU. For example, a transmitting UE may operate as active time related to SL DRX from the time point of transmitting a MAC PDU to the time point of receiving a HARQ feedback. Here, for example, the time point of receiving a HARQ feedback related to the MAC PDU may include a PSFCH slot used to receive a HARQ feedback.

If the time point of receiving a HARQ feedback related to the MAC PDU is included within an inactive time related to SL DRX of a transmitting UE, for example, the transmitting UE may operate as an active time related to SL DRX from the time point of transmitting a MAC PDU to the time point of receiving a HARQ feedback related to the MAC PDU, based on the interval between the time point of transmitting a MAC PDU and the time point of receiving a HARQ feedback related to the MAC PDU being less than a pre-configured interval. Here, for example, the pre-configured interval may be determined based on a priority related to a MAC PDU.

If the time point of receiving a HARQ feedback related to the MAC PDU is included within an inactive time related to SL DRX of a transmitting UE, for example, the transmitting UE may transmit a MAC PDU in which a HARQ feedback is enabled based on the transmitting UE transitioning to an active time related to SL DRX at the time point of receiving a HARQ feedback related to the MAC PDU. For example, a transmitting UE may transmit a MAC PDU in which a HARQ feedback is enabled, based on the time point of receiving a HARQ feedback related to the MAC PDU being included within an active time related to SL DRX of the transmitting UE.

FIG. 10 is another example of SL DRX operation based on HARQ feedback, according to one embodiment of the present disclosure. The embodiment of FIG. 10 may be combined with various embodiments of the present disclosure.

Referring to FIG. 10, a transmitting UE may obtain an SL DRX configuration including information related to an SL DRX cycle and information related to an active time, and may perform an SL DRX operation based on the SL DRX configuration. For example, at a time point when a transmitting UE transmits a MAC PDU to a receiving UE, a time point of receiving a HARQ feedback related to the MAC PDU may be included within an inactive time related to SL DRX of the transmitting UE.

If the time point of receiving a HARQ feedback related to the MAC PDU is included within an inactive time related to SL DRX of a transmitting UE, for example, the transmitting UE may transition to an active time related to SL DRX, at the time point of receiving a HARQ feedback related to the MAC PDU. For example, a transmitting UE may operate as an inactive time related to SL DRX from the time point of transmitting a MAC PDU to the time point of receiving a HARQ feedback. That is, a transmitting UE may maintain an inactive time related to SL DRX from the time point of transmitting a MAC PDU to the time point of receiving a HARQ feedback. Here, for example, the time point of receiving a HARQ feedback related to the MAC PDU may include a PSFCH slot used to receive a HARQ feedback.

Figure 11:
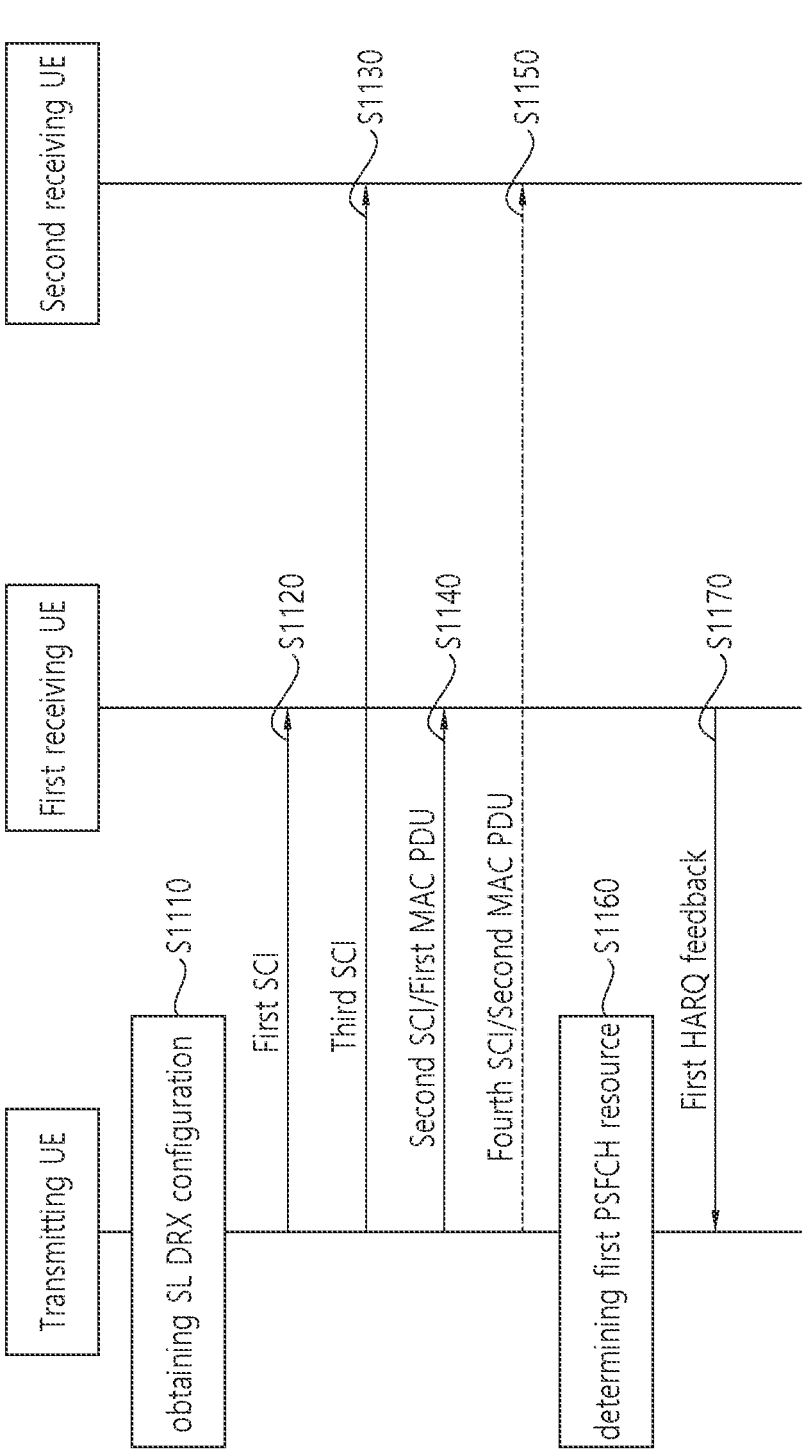
FIG. 11 shows a procedure for a transmitting UE to transmit a first MAC PDU and a second MAC PDU, according to one embodiment of the present disclosure.

FIG. 11 shows a procedure for a transmitting UE to transmit a first MAC PDU and a second MAC PDU, according to one embodiment of the present disclosure. The embodiment of FIG. 11 may be combined with various embodiments of the present disclosure.

Referring to FIG. 11, in step S1110, a transmitting UE may obtain an SL DRX configuration including information related to an SL DRX cycle and information related to an active time. For example, a transmitting UE may receive an SL DRX configuration from a base station. For example, a transmitting UE may determine an SL DRX configuration.

In step S1120, a transmitting UE may transmit, to a first receiving UE, first SCI for scheduling a first PSSCH through a first PSCCH. In step S1130, a transmitting UE may transmit, to a second receiving UE, third SCI for scheduling a second PSSCH through a second PSCCH. Here, for example, SCI format of first SCI and third SCI may be SCI format 1.

In step S1140, a transmitting UE may transmit, to a first receiving UE, second SCI and a first MAC PDU through a first PSSCH. In step S1150, a transmitting UE may transmit, to second receiving UE, fourth SCI and a second MAC PDU through a second PSSCH. Here, for example, SCI format of second SCI and fourth SCI may be SCI format 2-A or 2-B. For example, a transmitting UE may drop a second MAC PCU, when the second MAC PDU is a MAC PDU in which a HARQ feedback is enabled, based on a PSFCH slot used for receiving a second HARQ feedback for the second MAC PDU being included within an inactive time. Accordingly, for example, step S1150 may be omitted.

In step S1160, a transmitting UE may determine a first PSFCH resource within a first PSFCH slot, based on an index of a slot and an index of a subchannel, related to a first PSSCH In step S1170, a transmitting UE may receive, from a first receiving UE, a first HARQ feedback for the first MAC PDU based on the first PSFCH resource. For example, a first HARQ feedback may include any one of HARQ ACK or HARQ NACK.

For example, the first PSFCH slot may be included within an inactive time at a time point of transmitting a first MAC PDU. For example, the first PSFCH slot may be included within an active time at a time point of receiving the first HARQ feedback.

For example, a transmitting UE may be transitioned to an active time, based on the first PSFCH slot being included within an inactive time at the time point of transmitting a first MAC PDU. For example, the active time may be maintained to the time point of receiving a first HARQ feedback, from the time point of transmitting a first MAC PDU. Or, for example, the inactive time may be maintained until the time point of receiving the first HARQ feedback, from the time point of transmitting the first MAC PDU.

For example, a transmitting UE may be transitioned to an active time at the time point of receiving the first HARQ feedback.

For example, based on an interval between the time point of transmitting the first MAC PDU and the time point of receiving the first HARQ feedback being smaller than a pre-configured threshold, a transmitting UE may operate as an active time during the interval. For example, the pre-configured threshold may be determined based on a priority related to the first MAC PDU.

For example, the first MAC PDU in which a HARQ feedback is enabled may be transmitted, based on a transmitting UE being within an active time at the time point of receiving the first HARQ feedback.

For example, a timer related to SL DRX may be started, based on transmitting the first MAC PDU. For example, a transmitting UE may operate as an active time until the timer related to SL DRX expires.

For example, a transmitting UE may operate as an inactivity time at a time point in which a second HARQ feedback for the second MAC PDU is to be received. For example, based on the second MAC PDU being a MAC PDU in which a HARQ feedback is enabled, the second MAC PDU may be dropped. That is, for example, if the second MAC PDU is a MAC PDU in which a HARQ feedback is enabled, based on a PSFCH slot used to receive the second HARQ feedback for the second MAC PDU being included within an inactive time, a transmitting UE may drop a second MAC PDU. Alternatively, for example, a transmitting UE may change the second MAC PDU to a MAC PDU in which a HARQ feedback is disabled if the second MAC PDU is a MAC PDU in which HARQ feedback is enabled, based on a PSFCH slot used to receive the second HARQ feedback for the second MAC PDU being included within the inactive time.

For example, a transmitting UE receiving a HARQ feedback within an inactive time may be allowed, based on at least one of a cast type, a service type, or a quality of service (QoS) requirement.

FIG. 12 shows a method for a first device to receive first HARQ feedback for a first MAC PDU based on a first PSFCH resource, according to one embodiment of the present disclosure. The embodiment of FIG. 12 may be combined with various embodiments of the present disclosure.

Referring to FIG. 12, in step S1210, a first device 100 may obtain a SL DRX configuration including information related to an SL DRX cycle and information related to an active time. For example, a first device 100 may receive an SL DRX configuration from a base station. For example, a first device 100 may determine an SL DRX configuration.

In step S1220, a first device 100 may transmit, to a second device 200, first SCI for scheduling a first PSSCH through a first PSCCH. Here, for example, SCI format of first SCI may be SCI format 1.

In step S1230, a first device 100 may transmit, to a second device 200, second SCI and a first MAC PDU through a first PSSCH. Here, for example, SCI format of second SCI may be SCI format 2-A or 2-B.

In step S1240, a first device 100 may determine a first PSFCH resource within a first PSFCH slot, based on an index of a slot and an index of a subchannel, related to a first PSSCH.

In step S1250, a first device 100 may receive, from a second device 200, a first HARQ feedback for the first MAC PDU based on the first PSFCH resource. For example, a first HARQ feedback may include any one of HARQ ACK or HARQ NACK.

For example, the first PSFCH slot may be included within an inactive time at a time point of transmitting a first MAC PDU. For example, the first PSFCH slot may be included within an active time at a time point of receiving the first HARQ feedback.

For example, a first device 100 may be transitioned to an active time, based on the first PSFCH slot being included within an inactive time at the time point of transmitting a first MAC PDU. For example, the active time may be maintained to the time point of receiving a first HARQ feedback, from the time point of transmitting a first MAC PDU. Or, for example, the inactive time may be maintained until the time point of receiving the first HARQ feedback, from the time point of transmitting the first MAC PDU.

For example, a first device 100 may be transitioned to an active time at the time point of receiving the first HARQ feedback.

For example, based on an interval between the time point of transmitting the first MAC PDU and the time point of receiving the first HARQ feedback being smaller than a pre-configured threshold, a first device 100 may operate as an active time during the interval. For example, the pre-configured threshold may be determined based on a priority related to the first MAC PDU.

For example, the first MAC PDU in which a HARQ feedback is enabled may be transmitted, based on a first device 100 being within an active time at the time point of receiving the first HARQ feedback.

For example, a timer related to SL DRX may be started, based on transmitting the first MAC PDU. For example, a first device 100 may operate as an active time until the timer related to SL DRX expires.

For example, a first device 100 may transmit, a third device, third SCI for scheduling a second PSSCH through a second PSCCH. For example, a first device 100 may transmit, to a third device, fourth SCI and a second MAC PDU through a second PSSCH. Here, for example, the format of third SCI may be SCI format 1. For example, the format of fourth SCI may be SCI format 2-A or 2-B. For example, based on a PSFCH slot used to receive a second HARQ feedback for the second MAC PDU being included within an inactive time, if the second MAC PDU is a MAC PDU in which a HARQ feedback is enabled, a first device 100 may drop a second MAC PDU.

For example, a first device 100 may operate as an inactivity time at a time point in which a second HARQ feedback for the second MAC PDU is to be received. For example, based on the second MAC PDU being a MAC PDU in which a HARQ feedback is enabled, the second MAC PDU may be dropped. That is, for example, if the second MAC PDU is a MAC PDU in which a HARQ feedback is enabled, based on a PSFCH slot used to receive a second HARQ feedback for the second MAC PDU being included within an inactive time, a first device 100 may drop a second MAC PDU. Alternatively, for example, a first device 100 may change the second MAC PDU to a MAC PDU in which a HARQ feedback is disabled if the second MAC PDU is a MAC PDU in which HARQ feedback is enabled, based on a PSFCH slot used to receive a second HARQ feedback for the second MAC PDU being included within an inactive time.

For example, a first device 100 receiving a HARQ feedback within an inactive time may be allowed, based on at least one of a cast type, a service type, or a quality of service (QoS) requirement.

The embodiments described above may be applied to various devices described below. For example, a processor 102 of a first device 100 may obtain a SL DRX configuration including information related to an SL DRX cycle and information related to an active time. And, for example, a processor 102 of a first device 100 may control a transceiver 106 to transmit, to a second device 200, first SCI for scheduling a first PSSCH through a first PSCCH. And, for example, a processor 102 of a first device 100 may control a transceiver 106 to transmit, to a second device 200, second SCI and a first MAC PDU through a first PSSCH. And, for example, a processor 102 of a first device 100 may determine a first PSFCH resource within a first PSFCH slot, based on an index of a slot and an index of a subchannel, related to a first PSSCH. And, for example, a processor 102 of a first device 100 may control a transceiver 106 to receive, from a second device 200, a first HARQ feedback for the first MAC PDU based on the first PSFCH resource.

According to an embodiment of the present disclosure, a first device for performing wireless communication may be proposed. For example, a first device may comprise: one or more memories storing instructions; one or more transceivers; and one or more processors connected to the one or more memories and the one or more transceivers. For example, the one or more processors may execute the instructions to: obtain a sidelink discontinuous reception (SL DRX) configuration including information related to an SL DRX cycle and information related to an active time; transmit, to a second device, first sidelink control information (SCI) for scheduling a first physical sidelink shared channel (PSSCH) through a first physical sidelink control channel (PSCCH); transmit, to the second device, second SCI and a first medium access control (MAC) protocol data unit (PDU) through the first PSSCH; determine a first physical sidelink feedback channel (PSFCH) resource within a first PSFCH slot, based on an index of a slot and an index of a subchannel, related to the first PSSCH; and receive, from the second device, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink discontinuous reception (SL DRX) configuration including information related to an SL DRX cycle and information related to an active time; transmit, to a second UE, first sidelink control information (SCI) for scheduling a first physical sidelink shared channel (PSSCH) through a first physical sidelink control channel (PSCCH); transmit, to the second UE, second SCI and a first medium access control (MAC) protocol data unit (PDU) through the first PSSCH; determine a first physical sidelink feedback channel (PSFCH) resource within a first PSFCH slot, based on an index of a slot and an index of a subchannel, related to the first PSSCH; and receive, from the second UE, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

According to an embodiment of the present disclosure, a non-transitory computer-readable storage medium storing instructions may be proposed. For example, the instructions, when executed, may cause a first device to: obtain a sidelink discontinuous reception (SL DRX) configuration including information related to an SL DRX cycle and information related to an active time; transmit, to a second device, first sidelink control information (SCI) for scheduling a first physical sidelink shared channel (PSSCH) through a first physical sidelink control channel (PSCCH); transmit, to the second device, second SCI and a first medium access control (MAC) protocol data unit (PDU) through the first PSSCH;

determine a first physical sidelink feedback channel (PSFCH) resource within a first PSFCH slot, based on an index of a slot and an index of a subchannel, related to the first PSSCH; and receive, from the second device, a first hybrid automatic repeat request (HARQ) feedback for the first MAC PDU based on the first PSFCH resource. For example, the first PSFCH slot may be included within an inactive time at a time point of transmitting the first MAC PDU. For example, the first PSFCH slot may be included within an active time at a time point of receiving the first HARQ feedback.

FIG. 13 shows a method for a second device to transmit first HARQ feedback to a first MAC PDU based on a first PSFCH resource, according to one embodiment of the present disclosure. The embodiment of FIG. 13 may be combined with various embodiments of the present disclosure.

Referring to FIG. 13, in step S1310, a second device 200 may obtain an SL DRX configuration including information related to an SL DRX cycle and information related to an active time. For example, a second device 200 may receive an SL DRX configuration from a base station. For example, a second device 200 may determine an SL DRX configuration.

In step S1320, a second device 200 may receive, from a first device 100, first SCI for scheduling a first PSSCH through a first PSCCH. Here, for example, SCI format of first SCI may be SCI format 1.

In step S1330, a second device 200 may receive, from a first device 100, second SCI and a first MAC PDU through a first PSSCH. Here, for example, SCI format of second SCI may be SCI format 2-A or 2-B.

In step S1340, a second device 200 may transmit, to a first device 100, a first HARQ feedback for the first MAC PDU based on a first PSFCH resource. For example, a first HARQ feedback may include any one of HARQ ACK or HARQ NACK.

For example, a first PSFCH resource may be determined within a first PSFCH slot, based on an index of a slot and an index of a subchannel, related to a first PSSCH.

For example, the first PSFCH slot may be included within an inactive time at a time point of transmitting a first MAC PDU. For example, the first PSFCH slot may be included within an active time at a time point of receiving the first HARQ feedback.

For example, a first device 100 may be transitioned to an active time, based on the first PSFCH slot being included within an inactive time at the time point of transmitting a first MAC PDU. For example, the active time may be maintained to the time point of receiving a first HARQ feedback, from the time point of transmitting a first MAC PDU. Or, for example, the inactive time may be maintained until the time point of receiving the first HARQ feedback, from the time point of transmitting the first MAC PDU.

For example, a first device 100 may be transitioned to an active time at the time point of receiving the first HARQ feedback.

For example, based on an interval between the time point of transmitting the first MAC PDU and the time point of receiving the first HARQ feedback being smaller than a pre-configured threshold, a first device 100 may operate as an active time during the interval. For example, the pre-configured threshold may be determined based on a priority related to the first MAC PDU.

For example, the first MAC PDU in which a HARQ feedback is enabled may be transmitted, based on a first device 100 being within an active time at the time point of receiving the first HARQ feedback.

For example, a timer related to SL DRX may be started, based on transmitting the first MAC PDU. For example, a first device 100 may operate as an active time until the timer related to SL DRX expires.

For example, a first device 100 receiving a HARQ feedback within an inactive time may be allowed, based on at least one of a cast type, a service type, or a quality of service (QoS) requirement.

The embodiments described above may be applied to a variety of devices described below. First, for example, a processor 202 of a second device 200 may obtain an SL DRX configuration including information related to an SL DRX cycle and information related to an active time. And, for example, a processor 202 of a second device 200 may control a transceiver 206 to receive first SCI for scheduling a first PSSCH through a first PSCCH from a first device 100. And, for example, a processor 202 of a second device 200 may control a transceiver 206 to receive, from a first device 100, second SCI and a first MAC PDU through a first PSSCH. And, for example, a processor 202 of a second device 200 may control a transceiver 206 to transmit, to a first device 100, a first HARQ feedback for the first MAC PDU based on the first PSFCH resource.

According to an embodiment of the present disclosure, a second device for performing wireless communication may be proposed. For example, a second device may comprise: one or more memories storing instructions; one or more transceivers; and one or more processors connected to the one or more memories and the one or more transceivers. For example, the one or more processors may execute the instructions to: obtain a sidelink discontinuous reception (SL DRX) configuration including information related to an SL DRX cycle and information related to an active time; receive, from a first device, first sidelink control information (SCI) for scheduling a first physical sidelink shared channel (PSSCH) through a first physical sidelink control channel (PSCCH); receive, from the first device, second SCI and a first medium access control (MAC) protocol data unit (PDU) through the first PSSCH; and transmit, to the first device, a first hybrid automatic repeat request (HARQ) feedback for the first MAC PDU based on a first physical sidelink feedback channel (PSFCH) resource. For example, the first PSFCH resource may be determined within a first PSFCH slot, based on an index of a slot and an index of a subchannel, related to the first PSSCH. For example, the first PSFCH slot may be included within an inactive time at a time point of transmitting the first MAC PDU. For example, the first PSFCH slot may be included within an active time at a time point of receiving the first HARQ feedback.

Various embodiments of the present disclosure may be combined with each other.

Various embodiments of the disclosure may be implemented independently. Alternatively, various embodiments of the disclosure may be implemented in combination or in combination with each other. For example, while various embodiments of the present disclosure are described based on the 3GPP system for ease of description, various embodiments of the present disclosure may be extensible to systems other than the 3GPP system. For example, various embodiments of the present disclosure are not limited to direct inter-UE communication, but may also be used in uplink or downlink, where a base station, relay node, or the like may use the proposed methods according to various embodiments of the present disclosure. For example, information regarding whether a method according to various embodiments of the present disclosure applies may be defined that a base station informs to a UE, or a second device 200 informs to a receiving UE, through a predefined signal (e.g., a physical layer signal or a higher layer signal). For example, information regarding rules according to various embodiments of the present disclosure may be defined that a base station informs to a UE, or a second device 200 informs to a receiving UE, through a predefined signal (e.g., a physical layer signal or a higher layer signal).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
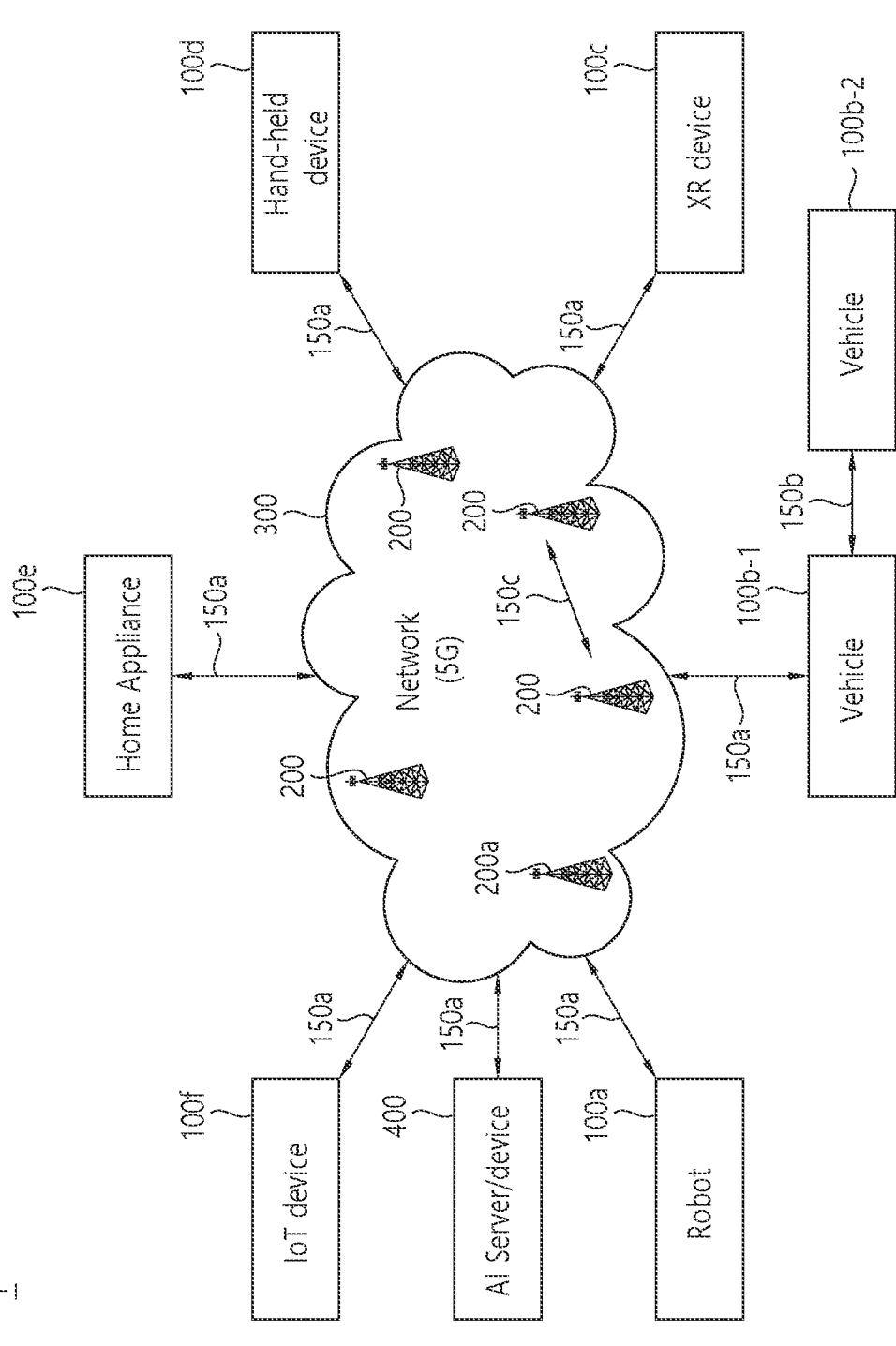
FIG. 14 shows a communication system 1, based on an embodiment of the present disclosure.

FIG. 14 shows a communication system 1, based on an embodiment of the present disclosure. The embodiment of FIG. 14 may be combined with various embodiments of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/ network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
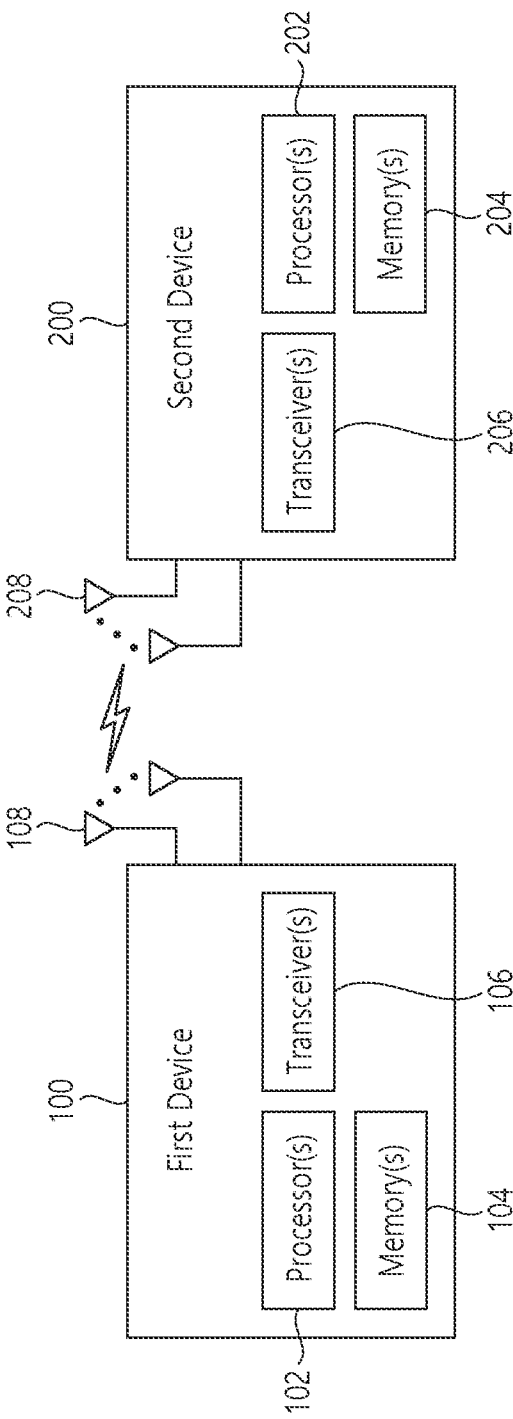
FIG. 15 shows wireless devices, based on an embodiment of the present disclosure.

FIG. 15 shows wireless devices, based on an embodiment of the present disclosure. The embodiment of FIG. 15 may be combined with various embodiments of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
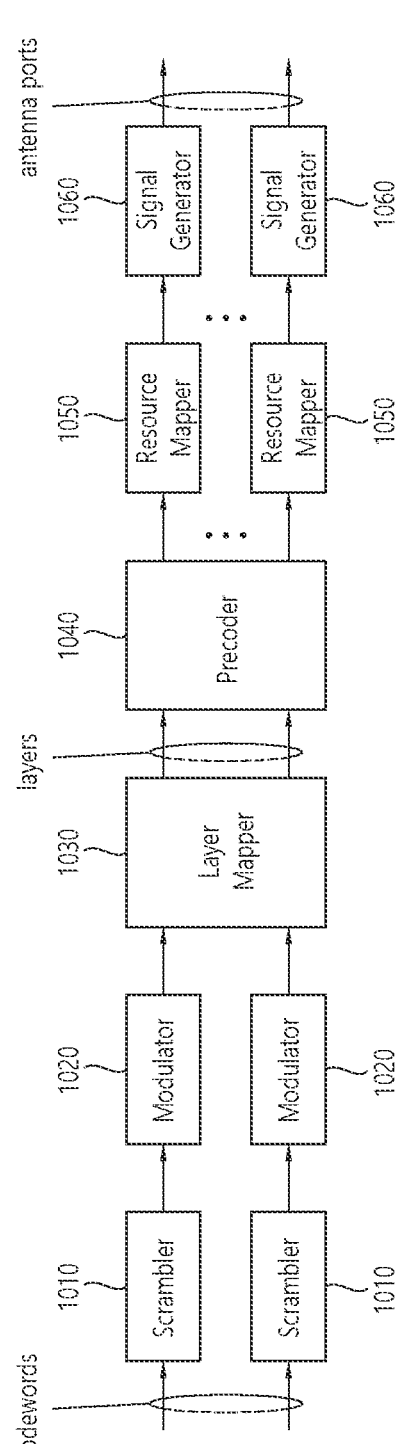
FIG. 16 shows a signal process circuit for a transmission signal, based on an embodiment of the present disclosure.

FIG. 16 shows a signal process circuit for a transmission signal, based on an embodiment of the present disclosure. The embodiment of FIG. 16 may be combined with various embodiments of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
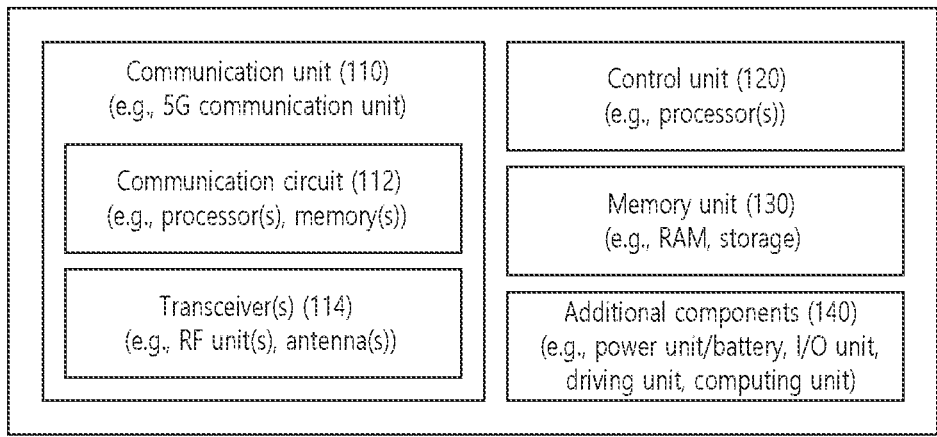
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 15). The embodiment of FIG. 17 may be combined with various embodiments of the present disclosure.

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
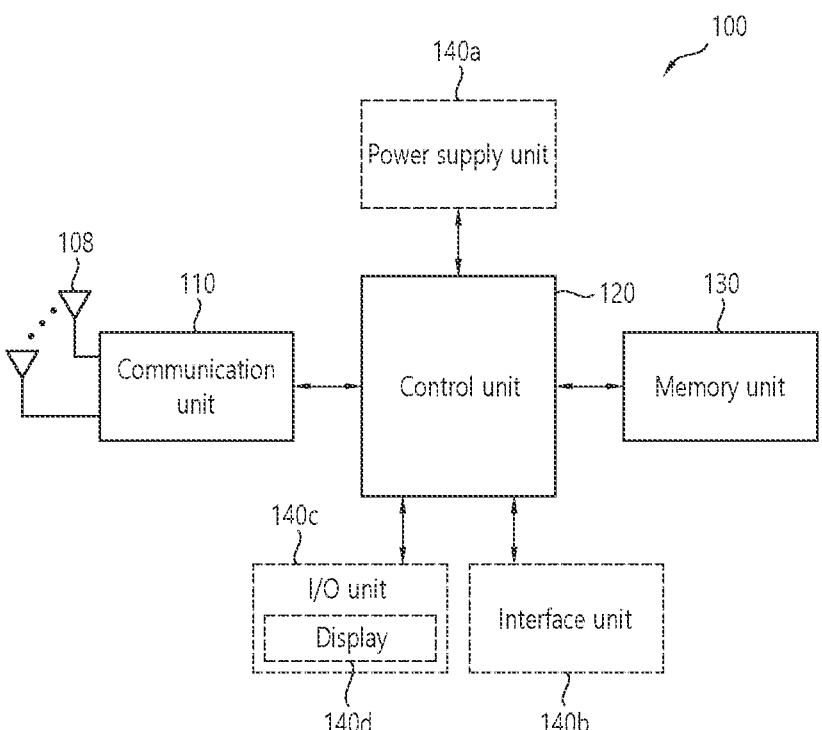
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 18 may be combined with various embodiments of the present disclosure.

Referring to FIG. 18, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 19:
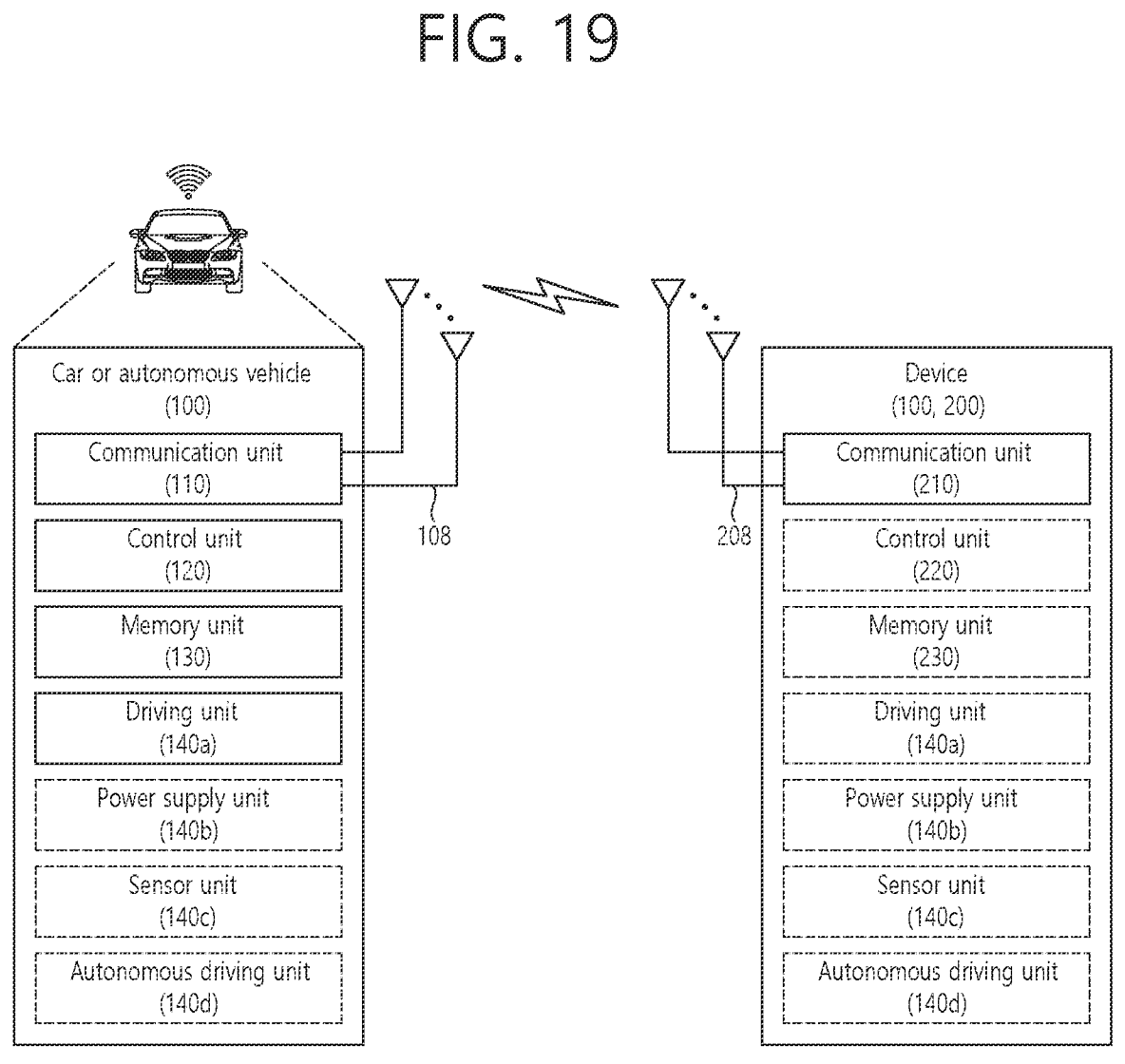

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 19 may be combined with various embodiments of the present disclosure.

Referring to FIG. 19, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:
1. A method comprising:
obtaining, by a first device, configuration information related to a sidelink discontinuous reception (SL DRX) including information related to an SL DRX cycle and information related to an active time;
transmitting, by the first device, to a second device, first sidelink control information (SCI) for scheduling a first physical sidelink shared channel (PSSCH) through a first physical sidelink control channel (PSCCH);
transmitting, by the first device, to the second device, second SCI and a first medium access control (MAC) protocol data unit (PDU) through the first PSSCH;

determining, by the first device, a first physical sidelink feedback channel (PSFCH) resource within a first PSFCH slot, based on an index of a slot and an index of a subchannel, related to the first PSSCH; and receiving, by the first device, from the second device, a first hybrid automatic repeat request (HARQ) feedback for the first MAC PDU based on the first PSFCH resource, wherein, based on an interval between a time point of transmitting the first MAC PDU and a time point of receiving the first HARQ feedback being smaller than a threshold, the first device remains in an active time during the interval, and wherein the threshold is determined based on a priority related to the first MAC PDU.

2. The method of claim 1, wherein, based on the first PSFCH slot being included within an inactive time at the time point of transmitting the first MAC PDU, the first device is transitioned to maintaining the active time during the interval between the time point of transmitting the first MAC PDU and the time point of receiving the first HARQ feedback.

3. The method of claim 1, wherein a timer related to SL DRX is started, based on transmitting the first MAC PDU, and wherein the first device operates as an active time until the timer related to SL DRX expires.

4. The method of claim 1, further comprising:

transmitting, a third device, third SCI for scheduling a second PSSCH through a second PSCCH;

transmitting, to the third device, fourth SCI and a second MAC PDU through the second PSSCH, wherein the first device is within an inactive time at a time point of receiving a second HARQ feedback for the second MAC PDU.

5. The method of claim 4, wherein the second MAC PDU is dropped, based on the second MAC PDU being a MAC PDU in which a HARQ feedback is enabled.

6. The method of claim 4, wherein the second MAC PDU is changed to a MAC PDU in which a HARQ feedback is disabled, based on the second MAC PDU being a MAC PDU in which a HARQ feedback is enabled.

7. The method of claim 1, wherein the first device receiving a HARQ feedback within an inactive time is allowed, based on at least one of a cast type, a service type, or a quality of service (QoS) requirement.

8. A first device comprising:

at least one transceiver;

at least one processor; and at least one memory connected to the at least one processor and storing instructions that, based on being executed, cause the first device to perform operations comprising:

obtaining configuration information related to a sidelink discontinuous reception (SL DRX) including information related to an SL DRX cycle and information related to an active time;

transmitting, to a second device, first sidelink control information (SCI) for scheduling a first physical sidelink shared channel (PSSCH) through a first physical sidelink control channel (PSCCH);

transmitting, to the second device, second SCI and a first medium access control (MAC) protocol data unit (PDU) through the first PSSCH;

determining a first physical sidelink feedback channel (PSFCH) resource within a first PSFCH slot, based on an index of a slot and an index of a subchannel, related to the first PSSCH; and receiving, from the second device, a first hybrid automatic repeat request (HARQ) feedback for the first MAC PDU based on the first PSFCH resource, wherein, based on an interval between a time point of transmitting the first MAC PDU and a time point of receiving the first HARQ feedback being smaller than a threshold, the first device remains in an active time during the interval, and wherein the threshold is determined based on a priority related to the first MAC PDU.

9. A processing device comprising:

at least one processor; and at least one memory connected to the at least one processor and storing instructions that, based on being executed, cause the at least one processor to control a first device to perform operations comprising:

obtaining configuration information related to a sidelink discontinuous reception (SL DRX) including information related to an SL DRX cycle and information related to an active time;

transmitting, to a second device, first sidelink control information (SCI) for scheduling a first physical sidelink shared channel (PSSCH) through a first physical sidelink control channel (PSCCH);

transmitting, to the second device, second SCI and a first medium access control (MAC) protocol data unit (PDU) through the first PSSCH;

determining a first physical sidelink feedback channel (PSFCH) resource within a first PSFCH slot, based on an index of a slot and an index of a subchannel, related to the first PSSCH; and receiving, from the second device, a first hybrid automatic repeat request (HARQ) feedback for the first MAC PDU based on the first PSFCH resource, wherein, based on an interval between a time point of transmitting the first MAC PDU and a time point of receiving the first HARQ feedback being smaller than a threshold, the first device remains in an active time during the interval, and wherein the threshold is determined based on a priority related to the first MAC PDU.

* * * * *